US009240085B2

(12) United States Patent
Baumert et al.

(10) Patent No.: US 9,240,085 B2
(45) Date of Patent: Jan. 19, 2016

(54) BALLOT PROCESSING SYSTEM FOR PRINTING IDENTIFIERS ON PAPER BALLOTS

(75) Inventors: Dean Baumert, Omaha, NE (US); Mike Dvorak, Plattsmouth, NE (US); Ken Carbullido, Omaha, NE (US)

(73) Assignee: ELECTION SYSTEMS & SOFTWARE, LLC, Omaha, NE (US)

( * ) Notice: Subject to any disclaimer, the term of this patent is extended or adjusted under 35 U.S.C. 154(b) by 805 days.

(21) Appl. No.: 12/771,831

(22) Filed: Apr. 30, 2010

(65) Prior Publication Data

US 2011/0017823 A1 Jan. 27, 2011

Related U.S. Application Data

(63) Continuation-in-part of application No. 12/723,262, filed on Mar. 12, 2010, now Pat. No. 8,261,984.

(60) Provisional application No. 61/228,825, filed on Jul. 27, 2009.

(51) Int. Cl.
*G06K 17/00* (2006.01)
*G07C 13/00* (2006.01)

(52) U.S. Cl.
CPC .................................... *G07C 13/00* (2013.01)

(58) Field of Classification Search
USPC .......................................... 235/51, 386, 468
See application file for complete search history.

(56) References Cited

U.S. PATENT DOCUMENTS

| | | | | |
|---|---|---|---|---|
| 5,248,872 | A * | 9/1993 | Stewart | 235/468 |
| 6,892,944 | B2 | 5/2005 | Chung et al. | |
| 7,077,313 | B2 | 7/2006 | Chung et al. | |
| RE40,449 | E * | 8/2008 | Provitola et al. | 235/386 |
| 7,516,891 | B2 | 4/2009 | Chaum | |
| 7,635,087 | B1 | 12/2009 | Chung et al. | |
| 7,635,088 | B2 | 12/2009 | Chung et al. | |
| 8,584,943 | B2 | 11/2013 | Morganstein | |
| 2002/0169756 | A1 | 11/2002 | Biddulph | |
| 2006/0053084 | A1 | 3/2006 | Haas et al. | |
| 2008/0116270 | A1 | 5/2008 | Wilson et al. | |
| 2009/0173778 | A1 * | 7/2009 | Cummings et al. | 235/51 |
| 2009/0308922 | A1 | 12/2009 | Chaum | |

OTHER PUBLICATIONS

Election Systems & Software, Inc. (formerly American Information Systems, Inc.), brochure entitled "AIS Model 315 Central Ballot Scanner Operator's Manual", Version 5.6.5, Oct. 1997 (94 pgs).

(Continued)

*Primary Examiner* — Rafferty Kelly
(74) *Attorney, Agent, or Firm* — Stinson Leonard Street LLP

(57) ABSTRACT

A ballot processing system for processing paper ballots having one or more voting selections marked thereon. The system includes an input area configured to receive a stack of ballots to be processed, a processor operable to determine the voting selections marked on the ballots, and an output area configured to store the processed ballots. In an exemplary embodiment, a printing device is operable to print a unique identifier on each of the ballots during each pass through the system. A detector is operable to detect the printed identifier so as to verify that each of the ballots was processed during a previous count of the ballots and/or to prevent double-processing of the ballots. The system also includes a printer operable to print a report that identifies ballot information in relation to the unique identifier for at least a portion of the processed ballots.

77 Claims, 31 Drawing Sheets

(56) References Cited

OTHER PUBLICATIONS

Election Systems & Software, Inc., brochure entitled "Model 550", published more than 1 year prior to Apr. 30, 2010, the filing date of this application, 1 pg.

Election Systems & Software, Inc., brochure entitled "Model 650 Central Ballot Counter", published more than 1 year prior to Apr. 30, 2010, the filing date of this application, 1 pg.

Election Systems & Software, Inc., brochure entitled "ES&S PCS: Central Count Scanner", published more than 1 year prior to Apr. 30, 2010, the filing date of this application, 2 pgs.

Election Systems & Software, Inc., brochure entitled "OPTECH IV-C, Model 200", published more than 1 year prior to Apr. 30, 2010, the filing date of this application, 1 pg.

Election Systems & Software, Inc., brochure entitled "OPTECH IV-C, Model 400", published more than 1 year prior to Apr. 30, 2010, the filing date of this application, 1 pg.

DRS Data Services Limited, booklet entitled "PS900 iM2", published more than 1 year prior to Apr. 30, 2010, the filing date of this application, 8 pgs.

Subcommittee on Elections, Committee on House Administration, House of Representatives, One Hundred Third Congress, Second Session, Text of Hearing on Alternative Ballot Techniques, Sep. 22, 1994, Washington, DC, 303 pgs.

* cited by examiner

Ballots Scanned Report

Jurisdiction Name
Election Name
Election Date

Report Run Date and Time

Batch #: 0035

Total Ballots Scanned: 930

Ballot # Range: 001258-002287
Batch Started: 11/04/08 22:14:37 Batch Completed: 11/04/08 22:30:00

Total Ballots Scanned by Precinct:

Precinct #0001: 10
Precinct #0002: 26
Precinct #0003: 37
Precinct #0004: 21
Precinct #0005: 44
Precinct #0006: 76
Precinct #0007: 16
Precinct #0008: 22
Precinct #0009: 17
Precinct #0010: 14
Precinct #0011: 25
Precinct #0012: 20
Precinct #0013: 21
Precinct #0014: 29
Precinct #0015: 32
Precinct #0016: 18
Precinct #0017: 15
Precinct #0018: 35
Precinct #0019: 29
Precinct #0020: 21
Precinct #0022: 28
Precinct #0023: 20
Precinct #0024: 38
Precinct #0025: 22
Precinct #0026: 45
Precinct #0027: 77
Precinct #0028: 23
Precinct #0029: 18
Precinct #0030: 15
Precinct #0031: 26
Precinct #0032: 21
Precinct #0033: 22
Precinct #0034: 30

END OF REPORT

Fig. 22

Ballots with Write Ins Report

Jurisdiction Name
Election Name
Election Date

Report Run Date and Time

Batch #: 0035

Total Ballots with Write Ins: 27

Ballot # Range: 001258-002287
Batch Started: 11/04/08 22:14:37 Batch Completed: 11/04/08 22:30:00

Ballots with Write Ins:

| Ballot # | # of Write Ins on Ballot | Contest(s) with Write Ins |
|---|---|---|
| 001258 | 2 | Presidential<br>Mayor |
| 001302 | 1 | Senate |
| 001478 | 2 | Presidential<br>Senate |
| 001489 | 2 | House Dist 1<br>Mayor |
| 001526 | 1 | Presidential |
| 001527 | 1 | Senate |
| 001544 | 2 | Presidential<br>Senate |
| 001601 | 2 | House Dist 1<br>Mayor |
| 001625 | 1 | Presidential |
| 001647 | 1 | Senate |
| 001695 | 2 | Presidential<br>Senate |
| 001703 | 2 | House Dist 1<br>Mayor |
| 001752 | 1 | Presidential |

Fig. 23A

Ballots with Write Ins Report

Jurisdiction Name
Election Name
Election Date

Report Run Date and Time

| | | |
|---|---|---|
| 001757 | 1 | Senate |

Ballots with Write Ins: Continued

| Ballot # | # of Write Ins on Ballot | Contest(s) with Write Ins |
|---|---|---|
| 001785 | 2 | Presidential |
| | | Senate |
| 001858 | 2 | Presidential |
| | | Mayor |
| 001882 | 1 | Senate |
| 001883 | 2 | Presidential |
| | | Senate |
| 001901 | 2 | House Dist 1 |
| | | Mayor |
| 001921 | 1 | Senate |
| 001925 | 2 | Presidential |
| | | Mayor |
| 001932 | 1 | Senate |
| 001951 | 2 | Presidential |
| | | Senate |
| 001967 | 2 | House Dist 1 |
| | | Mayor |
| 002001 | 1 | Presidential |
| 002002 | 1 | Senate |
| 002254 | 2 | Presidential |
| | | Senate |

END OF REPORT

Fig. 23B

Ballots Not Scanned Report

Jurisdiction Name
Election Name
Election Date

Report Run Date and Time

Batch #: 0035

Total Ballots Not Scanned: 15

Ballot # Range: 001258-002287
Batch Started: 11/04/08 22:14:37 Batch Completed: 11/04/08 22:30:00

Ballots Not Scanned Detail:

| Ballot # | Reason | Contest(s) |
|---|---|---|
| 001258 | Overvote | Presidential |
| 001302 | Blank | All |
| 001478 | Overvote | Presidential |
| | Write In | Senate |
| 001489 | Read Error | |
| 001526 | Invalid Ballot ID | |
| 001527 | Double Feed | |
| 001544 | Overvote | Presidential |
| 001601 | Overvote | House Dist 1 |
| | Write In | Mayor |
| 001625 | Read Error | |
| 001647 | Invalid Ballot ID | |
| 001695 | Double Feed | |
| | Read Error | |
| 001703 | Invalid Ballot ID | |
| | Double Feed | |

END OF REPORT

Fig. 24

BALLOT PROCESSING SYSTEM FOR PRINTING IDENTIFIERS ON PAPER BALLOTS

CROSS-REFERENCE TO RELATED APPLICATIONS

This application is a continuation-in-part of, and claims priority to, U.S. patent application Ser. No. 12/723,262, filed on Mar. 12, 2010, which in turn claims priority to U.S. Provisional Patent Application Ser. No. 61/228,825, filed on Jul. 27, 2009, each of which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to voting systems and, more particularly, to a ballot processing system that tabulates the voting selections marked on paper ballots.

2. Description of Related Art

A variety of different types of voting equipment are used in the United States and throughout the world. In many jurisdictions, a voter receives a paper ballot on which is printed the various contests to be voted on. The voter votes by darkening or otherwise marking the appropriate mark spaces on the paper ballot. The marked paper ballot may then be dropped in a ballot box, whereby the paper ballots accumulated in the ballot box are transferred to a central election office for tabulation. At the central election office, a central ballot counter is used to scan and tabulate the voting selections marked on paper ballots received from various polling locations. This same central ballot counter is also used to process the ballots in the event of a recount of a particular contest in the election.

Typically, the central ballot counter includes an input area for receiving a stack of, ballots to be processed, and an output area with a diverter for directing each processed ballot into one of several output bins. For example, one output bin may contain ballots that were properly processed by the central ballot counter, while other output bins may contain ballots that include a voting irregularity associated with a contest on the ballot (e.g., a write-in vote, an undervote, an overvote or a blank ballot) and/or ballots associated with a processing error (e.g., a read error, an invalid ballot identification code, or a double feed error). A canvass team may then review the ballots containing a voting irregularity and/or ballots associated with a processing error and take the appropriate action required by the jurisdiction. This process is very time-consuming in that the canvass team must review each individual ballot and determine the reason that the ballot was sorted into a particular output bin.

BRIEF SUMMARY OF THE INVENTION

The present invention is directed to a ballot processing system that is operable to scan and tabulate the voting selections marked on paper ballots received from various polling locations. The system comprises an input area configured to receive a stack of paper ballots to be processed. The input area preferably includes an imaging device, such as one or more cameras, that produce an image of each ballot. A processor electrically coupled to the imaging device processes the ballot image to determine the voting selections marked on the ballot prior to reaching an output area. The output area preferably includes a diverter operable to direct each ballot into one of several output bins based on instructions received from the processor.

In an exemplary embodiment, the system also includes a printing device (e.g., an ink cartridge) that prints an identifier on each of the ballots during each pass through the system, for example, during the initial count and any subsequent recount of the ballots. Preferably, the identifier comprises a unique string of alphanumeric characters (e.g., the serial number of the ballot processing system and a unique index number), but could alternatively comprise a non-unique identifier such as a graphic symbol (e.g., a small circle). The identifier may also be color-coded based on the number of passes through the system. For example, the identifiers may be printed in a first color during the initial count of the ballots and in a second color during a recount of the ballots, and so on with respect to additional recounts. A detector may also be provided for detecting the identifiers printed on the ballots. For example, if identifiers are printed on the ballots during the initial count, the detector may be used to detect the identifiers during the recount to verify that each of the ballots was processed during the initial count. Alternatively, the detector may be used to detect the identifiers during the initial count to prevent double-processing of the ballots.

The system may also include a printer that prints one or more reports relating to the processed ballots. Each report includes ballot information relating to at least a portion of the processed ballots, wherein the report identifies the ballot information in relation to the unique identifier for each of the ballots. For example, if one of the output bins stores ballots that include a voting irregularity associated with a contest on the ballot (e.g., a write-in vote, an undervote, an overvote or a blank ballot), the ballot information on the report may include an indication of the specific voting irregularity in relation to the unique identifier for each of the ballots. Also, if one of the output bins stores ballots associated with a processing error (e.g., a read error, an invalid ballot identification code, or a double feed error), the ballot information on the report may include an indication of the specific processing error in relation to the unique identifier for each of the ballots. Thus, a canvass team is able to quickly review the ballots that include a voting irregularity and/or are associated with a processing error by correlating the ballot information on the report to a particular paper ballot using the unique identifier.

BRIEF DESCRIPTION OF THE DRAWINGS

FIG. 22 is an exemplary output bin report for ballots properly voted and scanned by the system of FIG. 1;

FIGS. 23A-23B is an exemplary output bin report for ballots with write-in votes scanned by the system of FIG. 1;

FIG. 24 is an exemplary output bin report for ballots either improperly voted or improperly scanned by the system of FIG. 1.

DETAILED DESCRIPTION OF EXEMPLARY EMBODIMENT

The present invention is directed to a ballot processing system that prints an identifier on each processed ballot, wherein the identifier (i) may be detected in order to verify that the ballot was processed during a previous count of the ballots or to prevent double-processing of the ballot and (ii) may be printed on a report in order to assist a canvass team in reviewing ballots that include a voting irregularity and/or are associated with a processing error by correlating the ballot information on the report to a particular paper ballot. While the invention will be described in detail below with reference to an exemplary embodiment, it should be understood that the invention is not limited to the specific system configuration or methodology of this embodiment. In addition, although the exemplary embodiment is described as embodying several different inventive features, one skilled in the art will appreciate that any one of these features could be implemented without the others in accordance with the invention.

Figure 1:
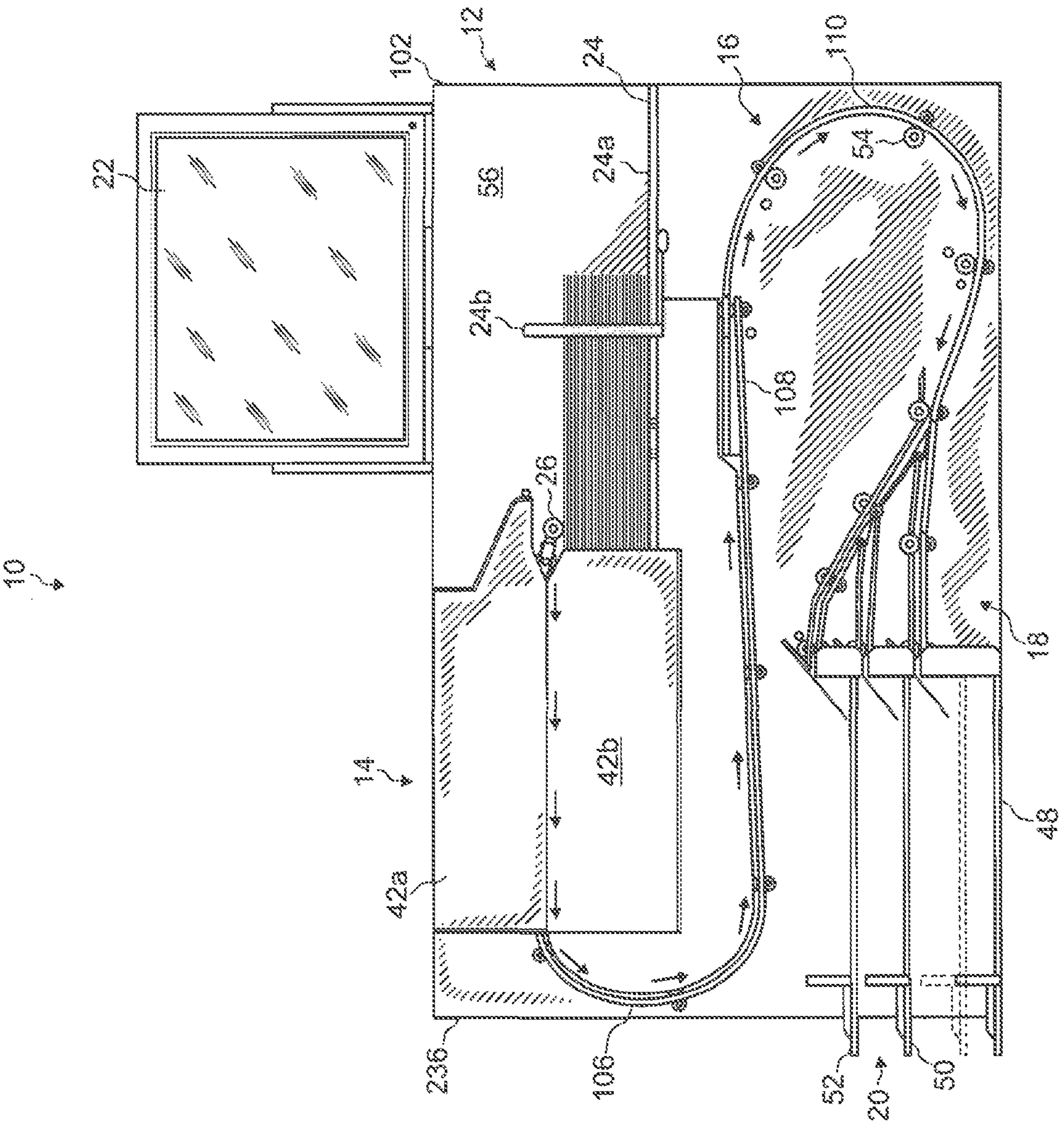
FIG. 1 is a front elevational view of an exemplary embodiment of a ballot processing system in accordance with the present invention.

Referring to FIG. 1, an exemplary embodiment of a ballot processing system in accordance with the present invention is designated as reference numeral 10. System 10 is a high-speed, self-contained machine that receives a stack of paper ballots and, for each ballot, scans and stores an image of the ballot, processes the ballot image to determine the voting selections marked on the ballot, tabulates the voting selections marked on the ballot, and sorts the ballot into an appropriate output bin. In one minute, the system is capable of imaging, processing, tabulating and sorting approximately 250 double-sided ballots that are 17 inches long or approximately 360 double-sided ballots that are 11 inches long.

Figure 25:
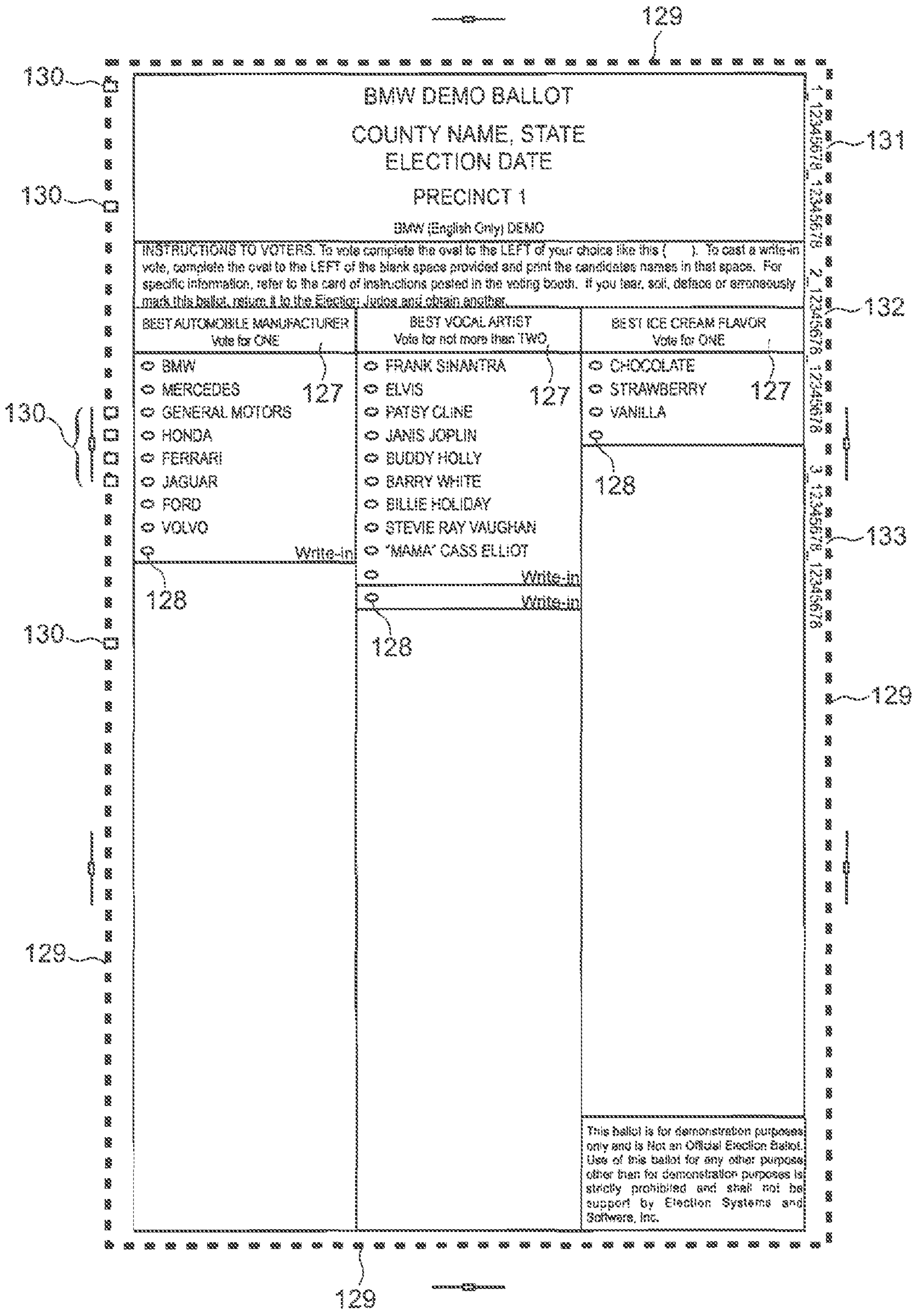
FIG. 25 is an exemplary ballot processed by the system of FIG. 1.

An exemplary election ballot that may be scanned and processed by system 10 is shown as reference numeral 126 in FIG. 25. Ballot 126 includes printed indicia 127 that includes a description of each contest (e.g., "Best Automobile Manufacturer") and the names of the candidates associated with each contest (e.g., "BMW," "Mercedes," etc.). Ballot 126 also includes mark spaces 128 corresponding to each of the candidates in each contest. As is known in the art, a voter may darken or otherwise mark the mark space corresponding to his/her selection for each of the contests. If a voter desires to enter a write-in candidate for a particular contest, he/she may darken the mark space corresponding to "Write-In" and hand-write the name of the write-in candidate. Alternatively, a voter may utilize a ballot marking device to print a mark in each of the appropriate mark spaces, such as the AutoMARK® ballot marking device sold by the assignee of the present application. Ballot 126 further includes a series of rectangular timing marks 129 positioned along the left and right sides and across the top and bottom of the ballot. The timing marks 129 permit system 10 to determine the position (i.e., row and column) of each of the mark spaces 128 on the ballot. The larger rectangular timing marks 130 positioned along the left side of the ballot also serve as code marks that are used to identify the ballot style of ballot 126 so that system 10 is able to associate the marked voting selections with the correct contests and candidates printed on the ballot. Of course, other types of ballots may be scanned and processed in accordance with the present invention.

Figure 2:
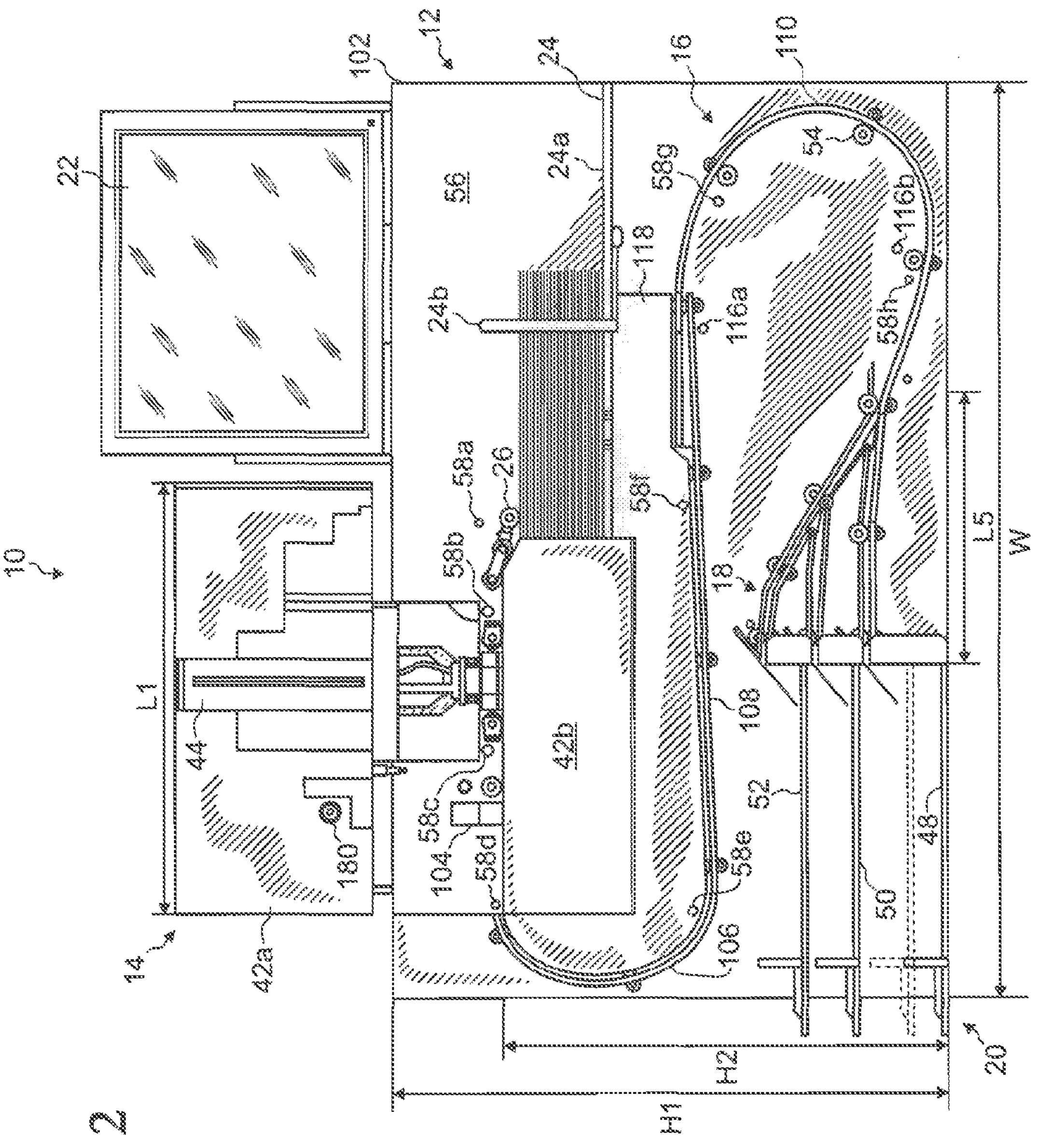
FIG. 2 is a front elevational view of the system of FIG. 1 with an upper read head housing pivoted to an upper position.

Referring to FIGS. 1 and 2, system 10 has an input area 12 with an input hopper 24 and an imaging area 14, an S-curve ballot transport path 16, and an output area 20 with a ballot diverter 18 and a plurality of output bins 48, 50 and 52. The term "input area" is used herein to refer to all of the system components positioned before the transport path, and the term "output area" is used herein to refer to all of the system components positioned after the transport path. Thus, transport path 16 is positioned between input area 12 and output area 20 of system 10.

System 10 also includes a user input device 22 comprising a touch screen display mounted above input area 12 on a pivotal mount so that users of varying heights can adjust the screen to a desirable viewing position. Input device 22 receives input for operating and/or diagnosing problems with the system. For example, input device 22 is operable to receive instructions for starting and stopping the ballot scanning process, setting up system parameters (such as the system date and time), and printing reports (such as diagnostic and election results reports). Although input device 22 is preferably a touch screen display, the input device could alternatively be a computer monitor that is coupled with a keyboard, mouse or other type of input device.

Input Area

Input area 12 includes an input hopper 24 for supporting a stack of ballots that are ready to be scanned and positioning the ballots so that each ballot may be drawn into the ballot imaging area 14 by a ballot pick-up mechanism 26 (FIGS. 2-5). Input hopper 24 can hold between approximately 500 to 600 ballots and includes a horizontal tray 24*a* and an adjustable paper guide 24*b*. Horizontal tray 24*a* is moveable up and down via a screw actuator 182, shown in FIG. 9, so that the top ballot in the ballot stack can be picked up by pick-up mechanism 26. Tray 24*a* ensures that pick-up mechanism 26 exerts a constant pressure on each ballot being picked from the ballot stack.

Figure 3:
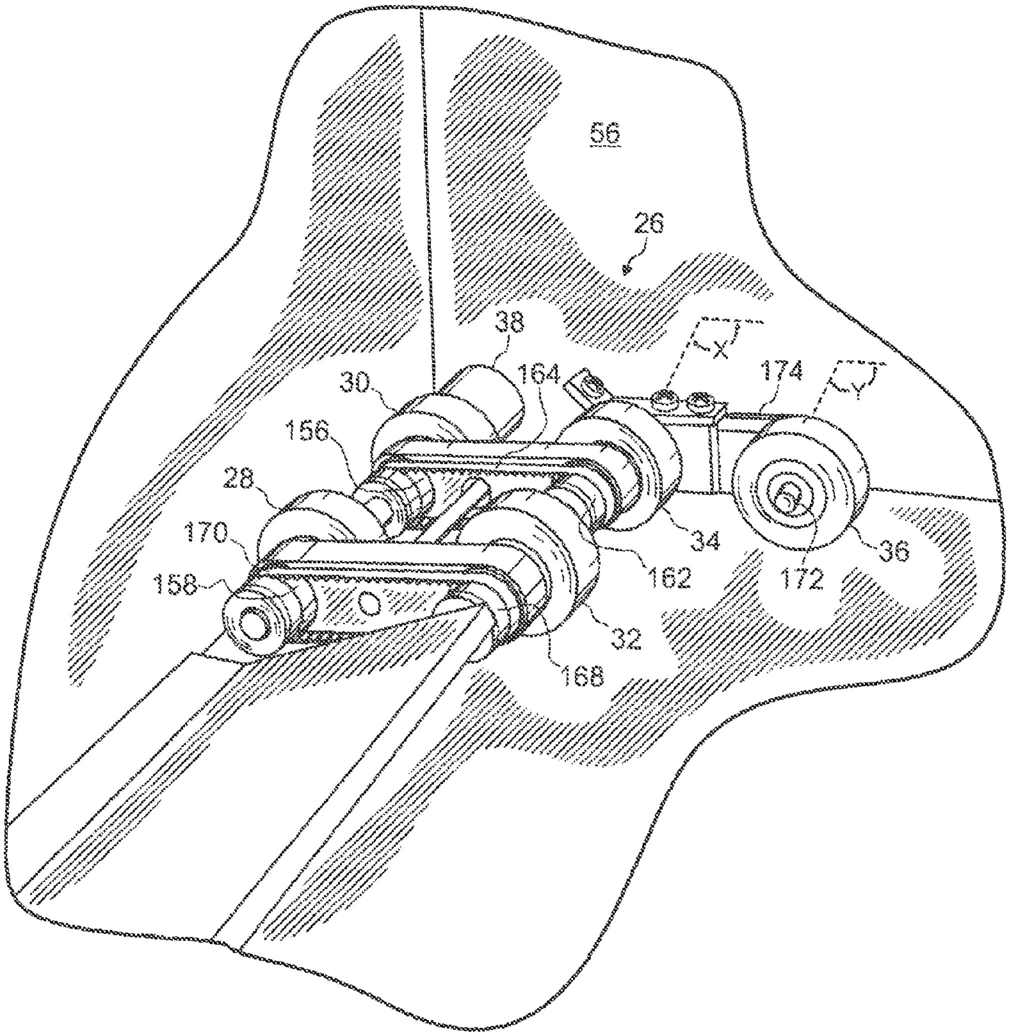
FIG. 3 is a close-up view of a ballot pick-up mechanism of the system of FIG. 1.
Figure 4:
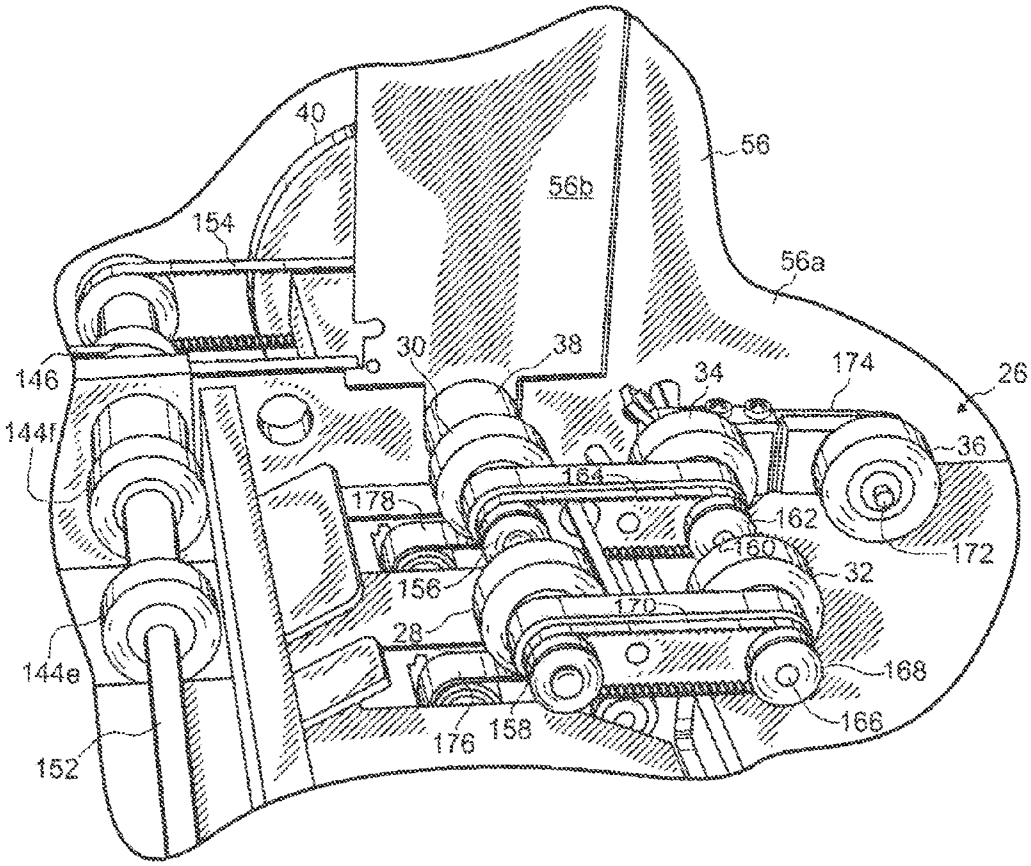
FIG. 4 is a close-up view of the pick-up mechanism shown in FIG. 3.

As shown in FIGS. 2-4, pick-up mechanism 26 is designed to eliminate the problems of drag, skew, and picking more than one ballot, which are common with conventional ballot processing systems. Further, pick-up mechanism 26 is designed to keep ballots properly aligned in imaging area 14 and along transport path 16. In the exemplary embodiment, pick-up mechanism 26 has five rollers 28, 30, 32, 34, and 36 (FIGS. 3 and 4), which rotate simultaneously to pull a ballot into imaging area 14. However, more or less rollers could be used. A main drive shaft 38 connected to rollers 28 and 30 is coupled to a large flywheel 40 (FIGS. 4 and 9), which maintains the pick-up mechanism's speed even when the mechanism picks up folded ballots.

Figure 9:
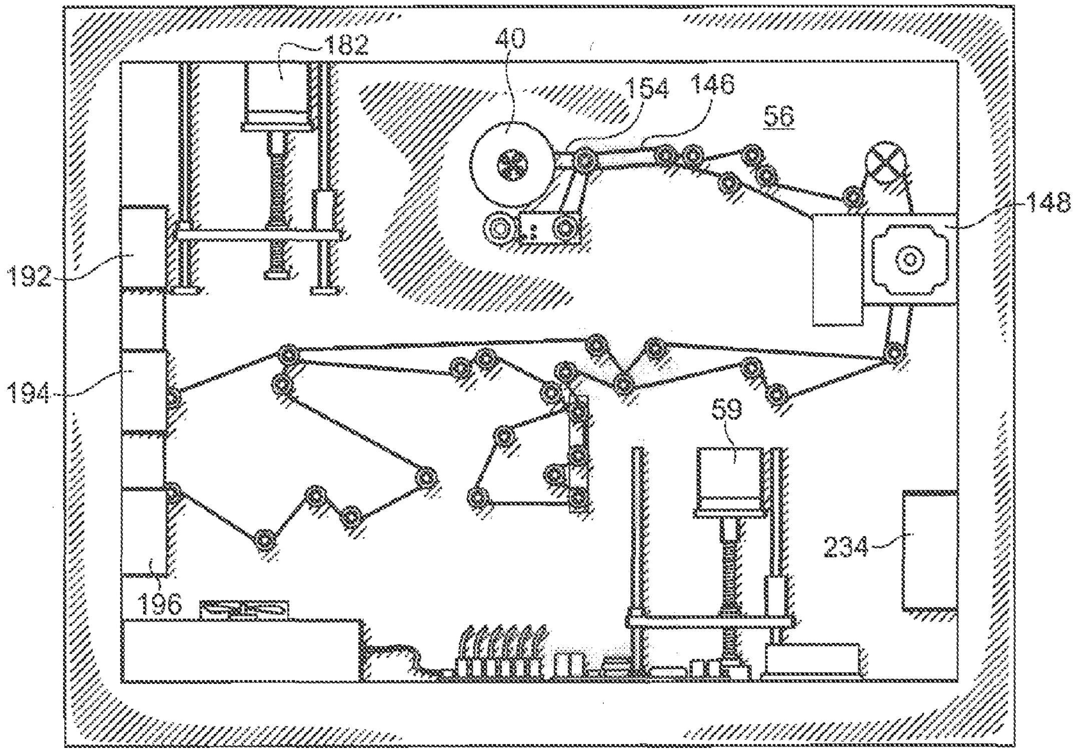
FIG. 9 is a rear elevational view of the system of FIG. 1 with a rear panel of the system removed.

Main drive shaft 38 is connected to a motor 148 via drive belts 146 and 154 (FIG. 9) to rotate main drive shaft 38 in a clockwise direction when the drive shaft is viewed from the front of the ballot processing system 10, as shown in FIG. 4. Main drive shaft 38 extends through and is perpendicular to a back plane 56 that provides a mounting surface for many of the system's components, as shown in FIGS. 1 and 9. A drive pulley 156 is mounted to main drive shaft 38 adjacent to roller 30, and another drive pulley 158 is mounted to main drive shaft 38 adjacent to roller 28.

Pick-up mechanism 26 also has a second drive shaft 160 (FIG. 4) with a roller 34 and adjacent drive pulley 162 mounted thereon. A drive belt 164 extends around drive pulleys 156 and 162 to transfer power from main drive shaft 38 to drive shaft 160. There is also a third drive shaft 166 (FIG. 4) with a roller 32 and adjacent drive pulley 168 mounted thereon. A drive belt 170 extends around drive pulleys 158 and 168 to transfer power from main drive shaft 38 to drive shaft 166. While main drive shaft 38 and drive shaft 166 are perpendicular to backplane 56, drive shaft 160 (FIG. 4) is positioned at an angle X (FIG. 3), which is preferably approximately 92 degrees, with respect to the back plane so that when roller 34 picks a ballot, the ballot is slightly pulled toward backplane 56. In other words, drive shaft 160 is positioned with respect to backplane 56 at a 2 degree angle more than main drive shaft 38.

Another drive pulley 162 is connected to drive shaft 160 on the opposite side of roller 34 for transferring power to a fourth drive shaft 172. Roller 36 is mounted on drive shaft 172 along with a drive pulley. A drive belt 174 extends around the drive pulleys on the shafts 160 and 172 for transferring power from drive shaft 160 to drive shaft 172. Drive shaft 172 is positioned at an angle Y (FIG. 3), which is preferably approximately 94 degrees, with respect to back plane 56 so that roller 36 slightly pulls a ballot toward backplane 56 like roller 34. In other words, drive shaft 172 is positioned with respect to back plane 56 at a 4 degree angle more than main drive shaft 38, and at a 2 degree angle more than drive shaft 160. When main drive shaft 38 rotates to pick the next ballot off of a ballot stack in hopper 24, each of drive shafts 160, 166, and 172 also rotate along with rollers 32, 34, and 36 mounted to the drive shafts.

The angles X and Y are designed so that when rollers 32, 34 and 36 pick a ballot from the top of a ballot stack, the rollers slightly direct the edges of the ballot into the back plane input section 56*a* (FIG. 4), as described below. The angles of the drive shafts 160 and 172 ensure that the edge of each ballot is pulled into contact with the back plane input section 56*a* so that each ballot is properly aligned as it enters imaging area 14 and ballot transport path 16.

Drive shafts 160 and 166 are hinged from main drive shaft 38 so that they are vertically moveable with respect to main drive shaft 38. Likewise, drive shaft 172 is hinged from drive shaft 160 such that it is vertically moveable with respect to drive shaft 160. The hinged design of drive shafts 160, 166 and 172 allows each of them to float freely with respect to main drive shaft 38, and, for drive shaft 172, with respect to drive shaft 160. The main drive shaft 38 is stationary except for rotational movement.

Because drive shafts 160, 166 and 172 are able to float freely and move vertically with respect to main drive shaft 38, rollers 32, 34 and 36 that are mounted to these drive shafts are not forced downward into the ballot on the top of the ballot stack, like a conventional belt drive or pick roller assembly. Instead, each of rollers 32, 34, and 36 "rests" on the top ballot in the ballot stack so that the only force exerted on the top ballot is the weight of rollers 32, 34 and 36 and the pick-up mechanism components to which the rollers are mounted. This enables rollers 32, 34 and 36 to consistently pick ballots even if there are ballots within input hopper 24 that stack higher or differently than other ballots within the hopper (e.g., folded ballots typically stack higher than flat, unfolded ballots). Because rollers 32, 34 and 36 are able to move vertically, they simply lay on the top ballot in input hopper 24 regardless of whether that ballot is folded or unfolded. This design, along with the motorized input hopper, ensures that the system applies the same pressure to each ballot that is picked up from the ballot stack.

Referring to FIG. 4, the pick-up mechanism also has two counter rotating retardation belts 176 and 178, which are positioned beneath rollers 28 and 30. There is a distance of approximately the thickness of one and a half ballots between rollers 28 and 30 and belts 176 and 178 for preventing more than one ballot from passing between the rollers and belts at a time. If rollers 32, 34 and 36 accidentally pick more than one ballot from the top of the ballot stack, then the counter rotating retardation belts 176 and 178 only allow the top ballot to pass through to imaging area 14. Belts 176 and 178 constantly rotate in the opposite direction as rollers 28, 30, 32, 34 and 36. If more than one ballot passes between rollers 28 and 30 and belts 176 and 178, then the bottom ballot becomes frictionally engaged with belts 176 and 178. Belts 176 and 178 prevent the bottom ballot from entering imaging area 14 by propelling it back toward the ballot stack, or belts 176 and 178 keep the bottom ballot stationary until the top ballot has a chance to pass out of pick-up mechanism 26 and into imaging area 14. Thus, if pick-up mechanism 26 picks up more than one ballot, it is self-correcting so that a user does not have to intervene and separate the ballots or restart the system.

As shown in FIG. 9, a single drive motor 148 powers the rollers within pick-up mechanism 26 and imaging area 14. A drive belt 146 (FIGS. 5 and 9) extends from drive motor 148 to the shafts 150 and 152 that mount the rollers 144*a-f* of the imaging area 14. There is another drive belt 154 coupled with the end of shaft 152 and extends from shaft 152 to flywheel 40. Drive belt 154 rotates at the same speed as drive belt 146 to link the rollers of imaging area 14 and pick-up mechanism 26 to ensure that they rotate at the same speed.

Flywheel 40 is mounted to main drive shaft 38 with an electronically controlled clutch so that drive motor 148 and drive belt 146 can constantly rotate the rollers within imaging area 14 at the same speed while allowing main drive shaft 38 of pick-up mechanism 26 to be disengaged from drive motor 148. Disengaging main drive shaft 38 of pick-up mechanism 26 from drive motor 148 allows the rollers of pick-up mechanism 26 to turn off and on for controlling the rate at which ballots are picked from the ballot stack.

Flywheel 40 has a relatively high mass to increase the moment of inertia of main drive shaft 38 when the clutch couples flywheel 40 and drive shaft 38. If flywheel 40 was not present, drive shaft 38 would slow down due to the force required to overcome the forces caused by friction between two adjacent ballots in input hopper 24 and acceleration of a ballot from rest. This slow down would in turn slow down drive belt 146 and imaging area rollers 144*a-f*. Because drive shaft 38 and flywheel 40 in combination have a higher moment of inertia than drive shaft 38 alone, the combination is better able to maintain the speed of main drive shaft 38, and thus the speed of drive belt 146 and imaging area rollers 144*a-f*, when the clutch engages flywheel 40 and drive shaft 38. The extra weight of flywheel 40 maintains the momentum and speed of pick-up mechanism rollers 28, 30, 32, 34 and 36 and imaging area rollers 144*a-f* (FIG. 5) throughout the process of picking up ballots, which is particularly important when the ballots are folded. Because flywheel 40 maintains ballot speed throughout imaging area 14, the cameras 44 and 46 (FIGS. 2 and 5) are able to maintain a constant resolution throughout the length of a ballot, and thus obtain clear, consistent ballot images.

System 10 keeps ballots properly oriented throughout imaging area 14 and transport path 16, while preventing the ballots' edges from fraying. As shown in FIG. 4, backplane 56 has an input section 56*a* that provides an offset of approximately 1/16 of an inch with respect to the remainder of the backplane 56*b*. Pick-up mechanism 26 pulls each ballot from the ballot stack so that the edge of the ballot contacts back plane input section 56*a*. Once the ballot moves past the back plane input section 56*a* and into imaging area 14, the edge of the ballot is no longer in contact with backplane 56 because the remainder of backplane 56*b* is spaced 1/16 of an inch backward from backplane input section 56*a*. Thus, backplane input section 56*a* properly orients ballots by guiding the ballot's edges through input section 56*a*. The offset of backplane input section 56*a* from the remainder of backplane 56*b* prevents a ballot from becoming damaged because the ballot is spaced from backplane 56 during transport along transport path 16. One skilled in the art will appreciate that if ballots processed by system 10 need to be recounted, the recount will be more consistent than it would be with other types of high speed ballot scanners because the ballots are not damaged due to constant contact with the back plane.

Figure 5:
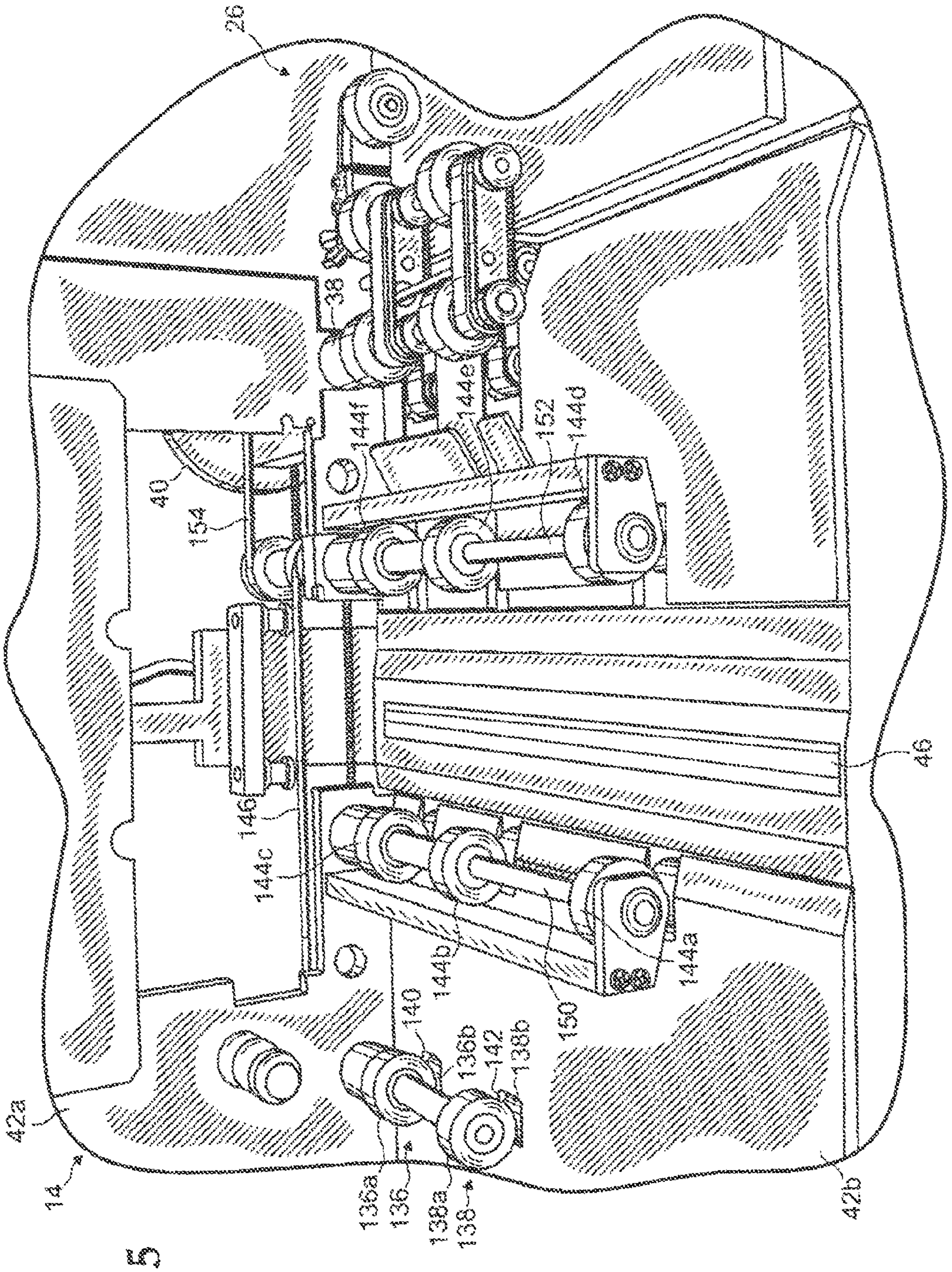
FIG. 5 is a close-up view of an imaging area of the system of FIG. 1.

Referring to FIGS. 2 and 5, imaging area 14 has upper and lower read head housings 42*a* and 42*b* that respectively contain upper and lower high-speed cameras 44 and 46. Cameras 44 and 46 are positioned to image both sides of a double-sided ballot. In the exemplary embodiment, cameras 44 and 46 are 60 megahertz digital electronic CCD cameras. As shown in FIG. 2, upper housing 42*a* can pivot upward with respect to lower housing 42*b* so that an operator may access the scanning components of system 10. It is within the scope of the invention for the imaging area 14 to only have one upper or lower high-speed camera if the system is used to scan and process one-sided ballots. As shown in FIG. 2, the length L1 of imaging area 14 is preferably between approximately 15 to 25 inches, and most preferably approximately 19 inches.

Referring to FIG. 2, an ink cartridge 104 is mounted adjacent to the ballot path in a position such that the cartridge can print an identifier on each ballot that passes through imaging area 14. Many different types and configurations of identifiers may be used in accordance with the present invention. For example, the identifier may comprise a unique string of alphanumeric characters such that each ballot has its own unique identifier. In this case, each unique identifier may be generated by the processor of the system. Alternatively, the identifier may comprise a graphic symbol, such as a small circle, that is the same on each ballot processed by the system. In addition, the identifier may comprise a barcode or other similar mark. Preferably, the identifier is printed in an area of the ballot comprised of white space so that the identifier does not print over the text on the ballot. One skilled in the art will understand that any type of printing device located in various positions within system 10 may be used in accordance with the present invention.

Ink cartridge 104 preferably contains more than one color of ink so that the cartridge is capable of printing an identifier with a different color each time the ballot is processed by the system. As an alternative to providing an ink cartridge with more than one color, a plurality of ink cartridges each having a different color may be provided to print a different colored identifier each time that a set of ballots is processed. Having an ink cartridge with different colors allows the system to identify how many times a ballot has passed through the system based on the color(s) of the identifier(s) printed on the ballot.

In the exemplary embodiment, the processor analyzes the image of each ballot to detect the various identifiers printed on the ballots. Alternatively, a detection system may be used in which a sensor uses the light spectrum to detect the color of an identifier based on light spectrometry. Another type of detection system relies on the use of different levels of a magnetic compound placed in various colors of ink and a magnetic sensor that detects the level of the magnetic compound within the ink to determine the color of the identifier. Further, if the identifier is a barcode, the detection system may comprise a standard barcode reader for reading the barcode printed on the ballot. Other types of detection systems known in the art may also be used in accordance with the present invention. Of course, if the system permits the ballots to be processed in any orientation, then a detector may need to be placed in four locations with respect to the ballot (top left, top right, bottom left and bottom right) in order to detect the identifier in any of four possible orientations.

Printing one or more identifiers on the ballots assists in recounting ballots because the system can easily determine whether a ballot has been counted and/or recounted based on whether a particular identifier has been printed on the ballot. For example, if a set of ballots is processed during an initial count of the ballots whereupon an identifier is printed on each ballot, and a court subsequently orders a recount of those ballots, then the system can be programmed to detect that identifier during the recount to ensure that the ballot was processed during the initial count. This feature may also be used to prevent processing a ballot more than once and thereby double counting the voting selections marked on the ballot. For example, the system can be programmed not to tabulate the voting selections marked on a ballot if a particular identifier is detected on the ballot (indicating that the ballot has already been scanned and tabulated).

In the exemplary embodiment, and referring to the ballot shown in FIG. 25, the first time that the system scans a ballot, ink cartridge 104 prints a black identification number 131 on the right edge of the ballot (just to the left of timing marks 129) to indicate that the ballot has been scanned once. This black identification number 131 may consist of, for example, the number of times that the ballot has been processed (i.e., "1" to indicate the initial count) followed by a machine serial number (i.e., "12345678") along with an incremental index number (i.e., "12345678") so as to provide a unique ballot identification number on each ballot processed by the system. If that same ballot passes through the system a second time, such as during a recount, then the system recognizes that the ballot has been scanned once due to the detection of the black identification number 131 and instructs ink cartridge 104 to mark the ballot with a blue identification number 132 positioned adjacent to and below the black identification number 131. The blue identification number 132 preferably has the same format as the black identification number 131, namely, the number of times that the ballot has been processed (i.e., "2" to indicate the recount) followed by a machine serial number (i.e., "12345678") along with an incremental index number (i.e., "12345678").

If that same ballot passes through the system a third time, such as during a second recount, then the system recognizes that the ballot has been scanned in the first recount due to the detection of the blue identification number 132 and instructs ink cartridge 104 to mark the ballot with a red identification number 133 positioned adjacent to and below the blue identification number 132. The red identification number 133 preferably has the same format as the blue and black identification number 131 and 132, namely, the number of times that the ballot has been processed (i.e., "3" to indicate the second recount) followed by a machine serial number (i.e., "12345678") along with an incremental index number (i.e., "12345678"). One skilled in the art will appreciate that this process will repeat each time the ballot is scanned by the system until the ballot is marked with as many colors as are present in ink cartridge 104.

While the incremental index number is illustrated as being the same number for identification numbers 131, 132 and 133, it should be noted that these numbers may be different in various passes through the system. Also, although identification numbers 131, 132 and 133 have been described as being printed in the colors black, blue and red, these numbers could all be printed in a single color (e.g., black) whereby the first digit of the identification number (indicating the number of times that the ballot has been processed) may be used to distinguish between the various passes through the system. It should also be understood that the location of identification numbers 131, 132 and 133 could be moved to any other white space on the ballot, as desired.

Transport Path

When a ballot leaves imaging area 14, it moves along transport path 16 until it reaches diverter 18. In the exemplary embodiment, transport path 16 includes a first curve section 106, a slightly inclined planar section 108, and a second curve section 110. As shown by the arrows in FIG. 1, once a ballot exits imaging area 14, it enters first curve section 106 where it is turned around to travel in the opposite direction along planar section 108. At the end of planar section 108, the ballot enters second curve section 110 where it is turned around before it reaches the diverter 18. Transport path 16 is designed so that by the time a ballot reaches diverter 18, system 10 has processed the ballot image to determine the voting selections marked on the ballot (described below). As such, the system is able to determine which output bin 48, 50 or 52 (FIG. 1) the ballot should be diverted to before the ballot reaches diverter 18.

Figure 10:
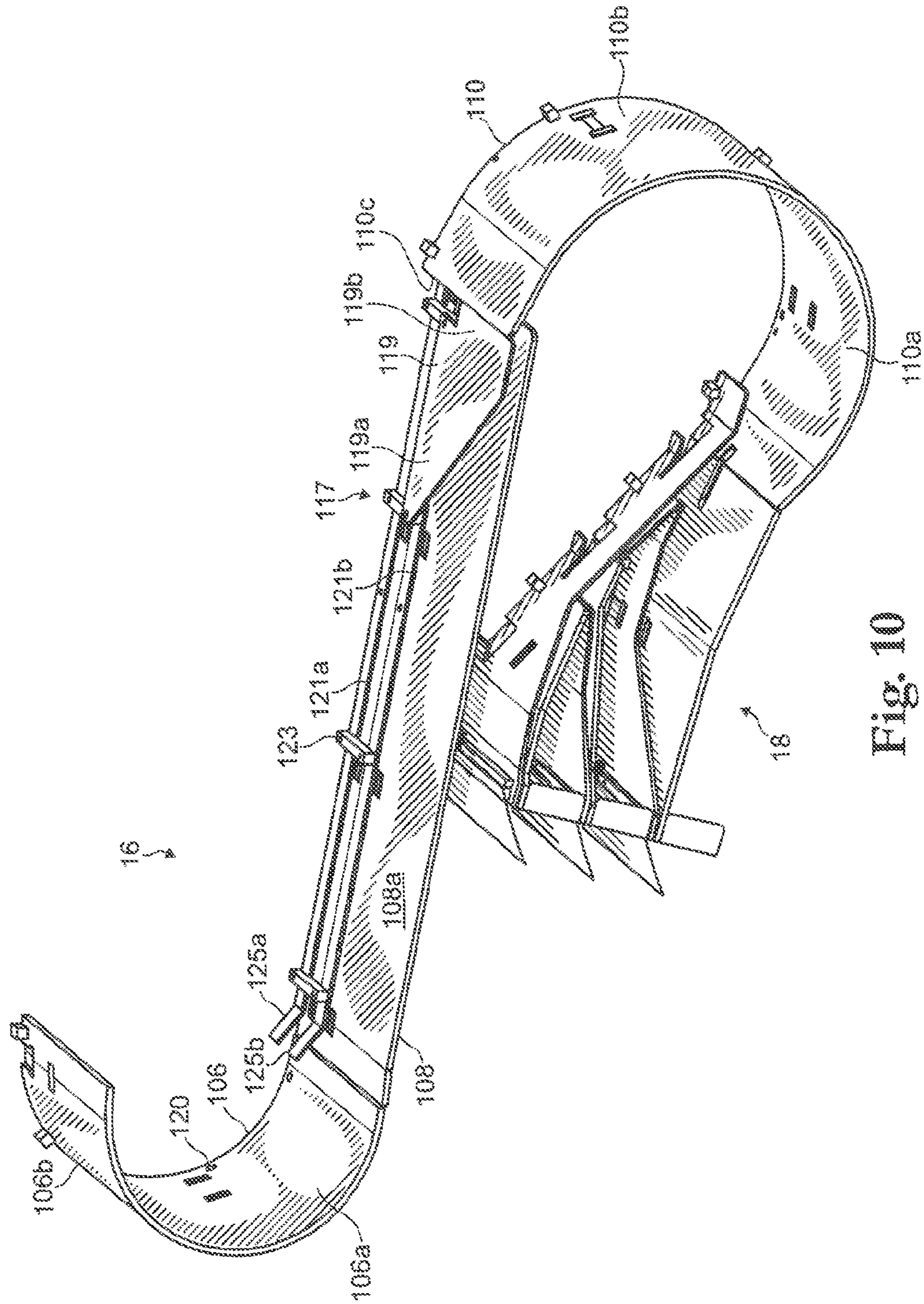
FIG. 10 is a perspective view of an S-curve ballot transport path of the system of FIG. 1.
Figure 11:
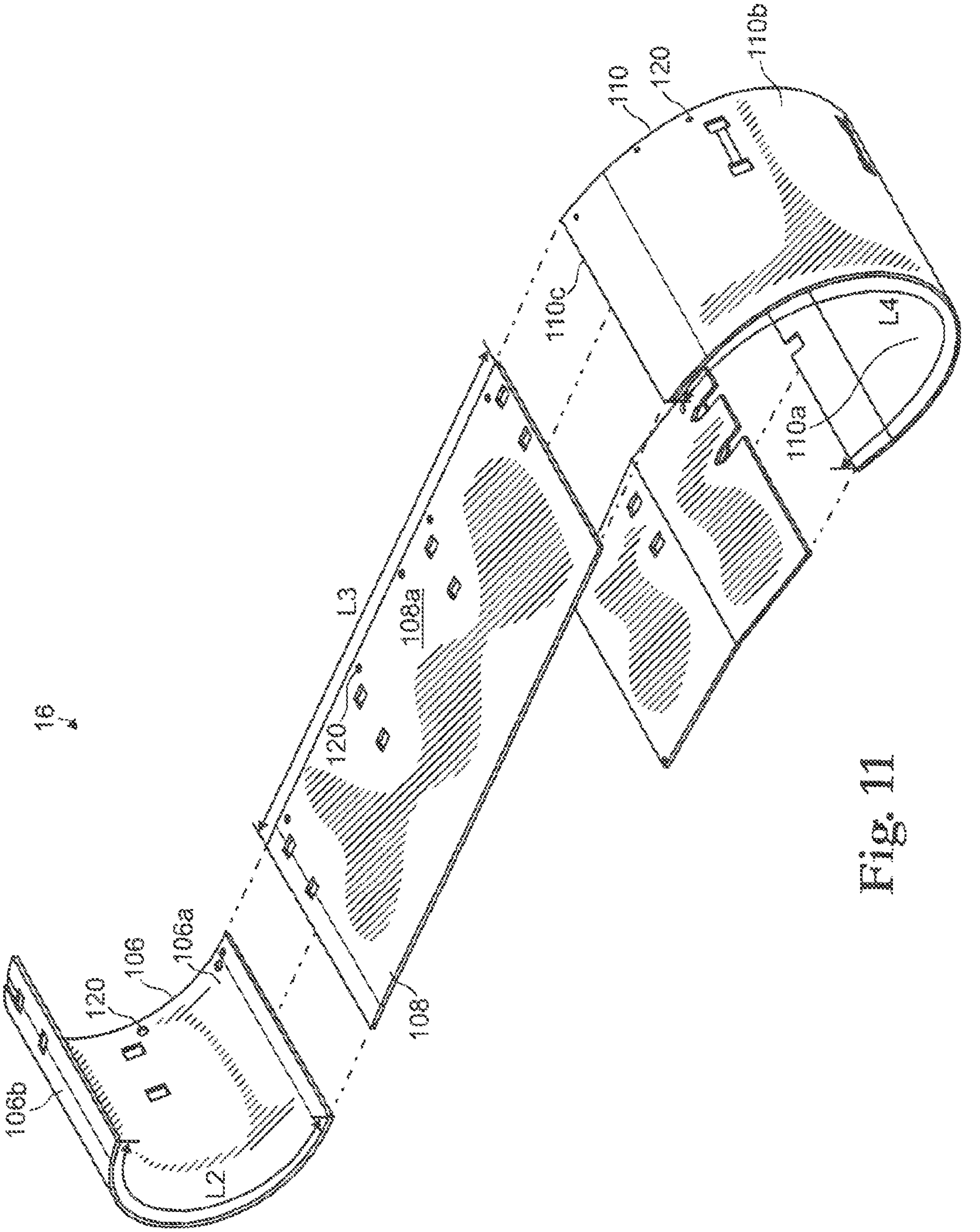
FIG. 11 is an exploded perspective view of the S-curve ballot transport path shown in FIG. 10.

Referring to FIGS. 10 and 11, first curve section 106 has a first surface 106*a* and a second surface 106*b*, planar section 108 has a first surface 108*a* and a second surface 108*b*, and second curve section 110 has a first surface 110*a* and a second surface 110*b*. It should be understood that a ballot passes over first surfaces 106*a*, 108*a* and 110*a* as it moves along transport path 16. First and second curved sections 106 and 110 are each configured to change the direction of a ballot's movement by approximately 180 degrees. Preferably, system 10 transports a ballot through transport path 16 at a speed of between approximately 50 to 120 inches per second, more preferably at a speed of between approximately 70 to 100 inches per second, and most preferably at a speed of approximately 85 inches per second.

The S-shaped configuration of transport path 16 allows the system to be relatively compact. As shown in FIG. 11, the arc section length L2 of first curve section 106 is preferably between approximately 10 to 20 inches, and most preferably approximately 14 inches. The length L3 of planar section 108 is preferably between approximately 15 to 30 inches, and most preferably approximately 23 inches. The arc section length L4 of second curve section 110 is preferably between approximately 15 to 25 inches, and most preferably approximately 22 inches. Thus, the sum of the lengths L2, L3 and L4 is between approximately 40 to 75 inches, more preferably between approximately 50 to 70 inches, and most preferably approximately 60 inches. Also, the height H2 of transport path 16 is preferably between approximately 10 to 20 inches, and most preferably approximately 16 inches.

First curve section 106, planar section 108 and second curve section 110 each have a plurality of mounting holes, one of which is shown as reference numeral 120 in FIG. 11, that extend from the respective first surfaces 106*a*, 108*a* and 110*a* to the respective second surfaces 106*b*, 108*b* and 110*b*. Each of the mounting holes 120 corresponds with a mount, one of which is shown as reference numeral 122 in FIG. 12, that extends outwardly from backplane 56. The mount 122 has a hole 124 that aligns with one of the mounting holes 120 in first curve section 106, planar section 108 or second curve section 110. To secure first curve section 106, planar section 108 and second curve section 110 to back plane 56, a fastener (not shown) is inserted into the hole 120 from the first surface 106*a*, 108*a* and 110*a* into the hole 124 in the mount 122. Preferably, the fastener and the hole 124 in the mount 122 are threaded, and each of the holes 120 are countersunk on the first surfaces 106*a*, 108*a*, and 110*a* so that the head of the fastener does not protrude above the surface and interfere with a ballot passing through the transport path. Although first curve section 106, planar section 108 and second curve section 110 are preferably mounted to backplane 56 as described above, it is within the scope of the invention to utilize other mounting devices as is known in the art.

Referring to FIG. 10, there is a paper guide system 117 that mounts to back plane 56 and that is spaced a distance above the first surface 108*a* of planar section 108. Paper guide system 117 preferably mounts to backplane 56 in a similar manner as planar section 108. Paper guide system is not shown in FIG. 11 for clarity. Paper guide system 117 ensures that a ballot maintains close contact with surfaces 108*a* and 110*a* as the ballot transitions from planar section 108 to second curve section 110.

Paper guide system 117 consists of a triangular-shaped plate 119, two runners 121*a* and 121*b*, and mounting brackets, one of which is shown as reference numeral 123. The mounting brackets attach to backplane 56 and each of runners 121*a* and 121*b* to space them apart a desirable distance. Two of the mounting brackets also attach t triangular plate 119 so as to mount it to backplane 56. Each runner 121*a* and 121*b* includes a front section 125*a* and 125*b* which is angled upward from the main section of the runner in order to facilitate the transition of a ballot from first curve section 106 to planar section 108 and to prevent a ballot from becoming jammed on runners 121*a* and 121*b*. Triangular plate 119 has a narrow front section 119*a* that transitions into a wider rear section 119*b* adjacent second curve section 110. Rear section 119*b* of triangular plate 119 has approximately the same width as a ballot passing through transport path 16. Rear section 119*b* is designed to prevent the outside edge of a ballot from raising up and striking a leading edge 110*c* of second curve section 110 as the ballot transitions from planar section 108 into second curve section 110.

A plurality of rollers, one of which is shown as reference numeral 54 in FIG. 1, are spaced along imaging area 14 and transport path 16 to transport a ballot to diverter 18. The rollers are designed so that the edge of each ballot is not in constant contact with backplane 56. Specifically, a ballot transported through the system is spaced approximately 1/16 of an inch from backplane 56, as discussed above, in order to prevent the ballot's edge from fraying.

Two of the sets of rollers are shown in FIG. 5 as reference numerals 136 and 138. Each set of rollers consists of a top roller 136*a*, 138*a* that contacts the top of a ballot, and a bottom roller 136*b*, 138*b* that contacts the bottom of the ballot. Bottom rollers 136*b* and 138*b* protrude upward through generally rectangular-shaped apertures 140, 142 in housing 42*b*. Rollers 136 are positioned generally adjacent backplane 56, while rollers 138 are spaced a distance from backplane 56 such that they are positioned generally adjacent the center of a ballot passing through the rollers. As shown in FIGS. 10 and 11, there are similar pairs of openings in transport path 16 for receiving rollers having a similar configuration as rollers 136, 138. As shown in FIG. 5, there are sets of triple rollers 144*a*, 144*b*, 144*c*, 144*d*, 144*e*, and 144*f* on each side of camera 46 in imaging area 14. Because at least two sets of dual rollers are in contact with a ballot at all times, the ballot maintains its correct alignment (which is first established by backplane input section 56*a*) throughout the imaging area 14 and transport path 16. Of course, it is within the scope of the invention to use more or fewer sets of rollers.

Figure 12:
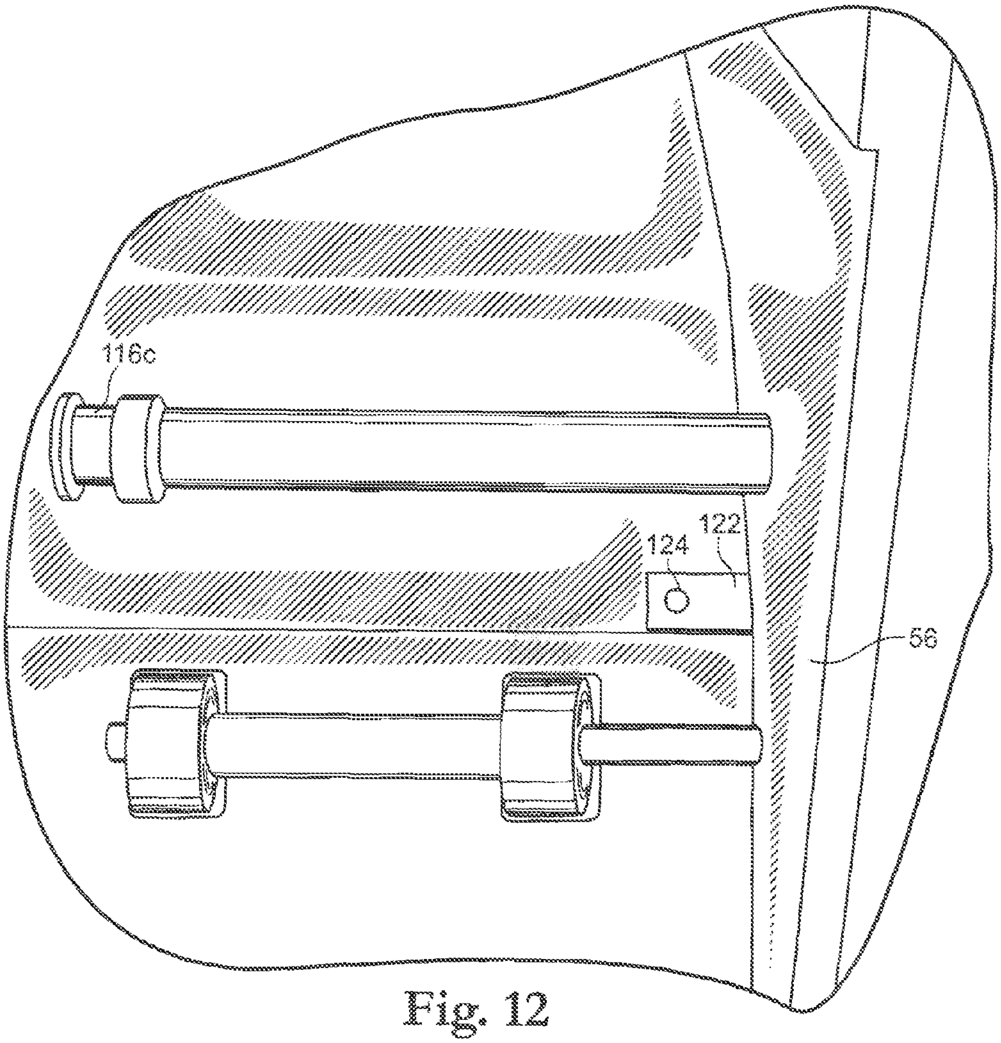
FIG. 12 is a close-up view of a mount of the S-curve ballot transport path shown in FIG. 10.

Protective cover mounts 116*a* and 116*b* (FIG. 2) are preferably provided on back plane 56 for mounting a protective cover (not shown) over the rollers and sensors beneath planar section 108 and above curved section 110. A protective cover mount 116*c* that is similar to mounts 116*a* and 116*b* is shown in FIG. 12. A protective cover 118, shown in FIG. 2, is mounted to backplane 56 with mounts similar to mounts 116*a-c* for protecting rollers along transport path 16. There is another protective cover (not shown) that mounts to back plane 56 with mounts similar to mounts 116*a-c* to the right of second curve section 110 when viewed as in FIG. 2.

While the exemplary embodiment includes a transport path having an S-shaped configuration, one skilled in the art will understand that other configurations could be used in accordance with the present invention. For example, the transport path could have a configuration consisting of two, four or even six S-shaped paths connected together. Preferably, the transport path contains an even number of curved sections so that the input and output bins are located on opposite sides of the device. This configuration will provide the optimal workflow so that workers loading ballots into the input bin and workers removing processed ballots from the output bins do not cross paths or accidentally grab a stack of ballots from the wrong bin.

Output Area

Figure 7:
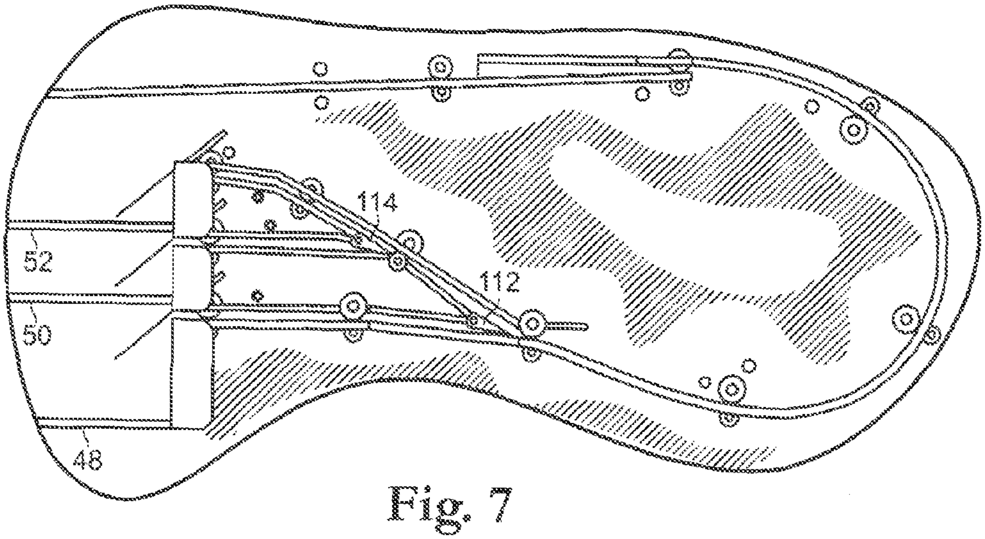
FIG. 7 is a close-up view of a ballot diverter of the system of FIG. 1 showing shunts in a first position.
Figure 8:
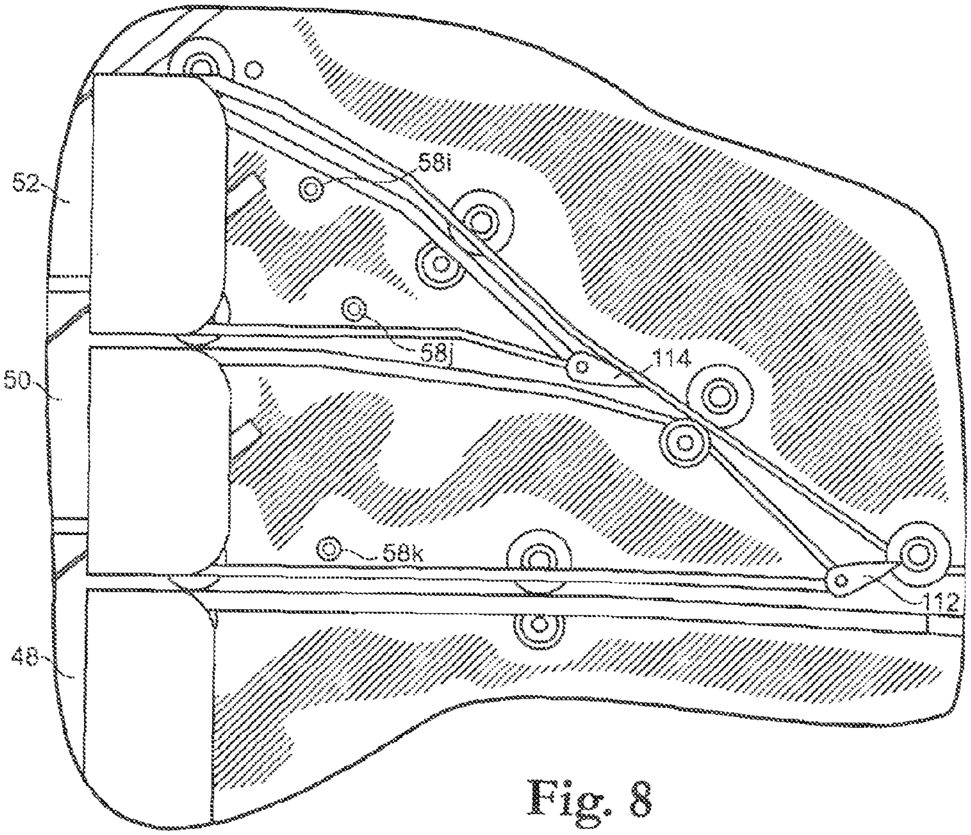
FIG. 8 is a close-up view of the ballot diverter of the system of FIG. 1 showing shunts in a second position.

Referring to FIGS. 7 and 8, output area 14 includes a diverter 18 that includes two shunts 112 and 114 that are pivotable to direct a ballot into one of three output bin 48, 50 or 52. When shunt 112 is in its first position, as shown in FIG. 7, it directs a ballot upward away from the lower output bin 48. When shunt 114 is in its first position, as shown in FIG. 7, it directs a ballot upward away from the middle output bin 50. Thus, when shunts 112 and 114 are in the positions shown in FIG. 7, ballots are directed into the upper output bin 52. If shunt 114 is pivoted upward into its second position, as shown in FIG. 8, and shunt 112 remains as shown in FIG. 7, then a ballot is directed into middle output bin 50. If shunt 112 is pivoted upward into its second position, as shown in FIG. 8, then a ballot is directed into the lower output bin 48. As shown in FIG. 2, the length L5 of diverter 18 is preferably between approximately 8 to 15 inches, and most preferably approximately 12 inches.

System 10 diverts a ballot into output bins 48, 50 or 52 (FIG. 1) based on the processing of the ballot. For example, a ballot that is properly marked by a voter and properly scanned by the system may be defined as a "scanned" ballot and diverted to output bin 48; a ballot that has one or more write-in votes may be defined as a "write-in" ballot and diverted to output bin 50, and a ballot that was improperly marked by a voter (e.g., containing one or more under-votes, over-votes and/or blank contests) or improperly scanned (e.g., unclear image and/or multiple ballots scanned at one time) may be defined as a "not scanned" ballot and diverted to output bin 52. The system is preferably configured so that each of these types of ballots may be diverted into a different output bin 48, 50, or 52. Of course, one skilled in the art will understand that the "scanned," "write-in" and "not scanned" definitions are merely examples, and that the system 10 could be configured to divert ballots into output bins 48, 50, and 52 based on other defined criteria.

The following is a non-exhaustive list of different ballot types that the system may be programmed to recognize and divert into a specific output bin:

A. Good Scans: ballots that were voted and scanned properly.

B. Write-In Ballots: ballots having a write-in vote for at least one contest.

C. Bad Scans: ballots having an unclear document image and/or that were improperly scanned due to an interruption.

D. Multiple Ballots: ballots that entered the imaging area with another ballot thereby blocking the system's ability to capture simultaneous images of the ballot with the upper and lower cameras.

E. Blank Ballots: ballots having no votes.

F. Over-Voted Ballots: ballots having at least one contest with more than the allowable number of votes.

G. Under-Voted Ballots: ballots having at least one contest with less than the allowable number of votes.

H. Crossover Votes: ballots having votes in contests for more than two political parties where the ballot contains the contests for each political party in a primary election and the voter is only allowed to vote for one of those political parties.

Preferably, in accordance with the descriptions above, "Good Scans" are directed to output bin 48, "Write-In Ballots" are directed to output bin 50, and ballots defined by one of the conditions defined in C-H above are directed to output bin 52.

The bottom output bin 48 is moveable via a screw actuator 59 (FIG. 9) to facilitate access to the ballots in the bin and to reduce the free fall time of a ballot as it moves from diverter 18 to output bin 48. Preferably, output bin 48 moves downward after a batch of ballots has been scanned for removal of the scanned ballots and upward before the system scans a batch of ballots for reception of the scanned ballots. When output bin 48 is in its upward position (shown in FIG. 1 in dashed lines) it prevents folded ballots from catching on the raised fold lines of the previous ballot deposited in the bin.

Figure 6:
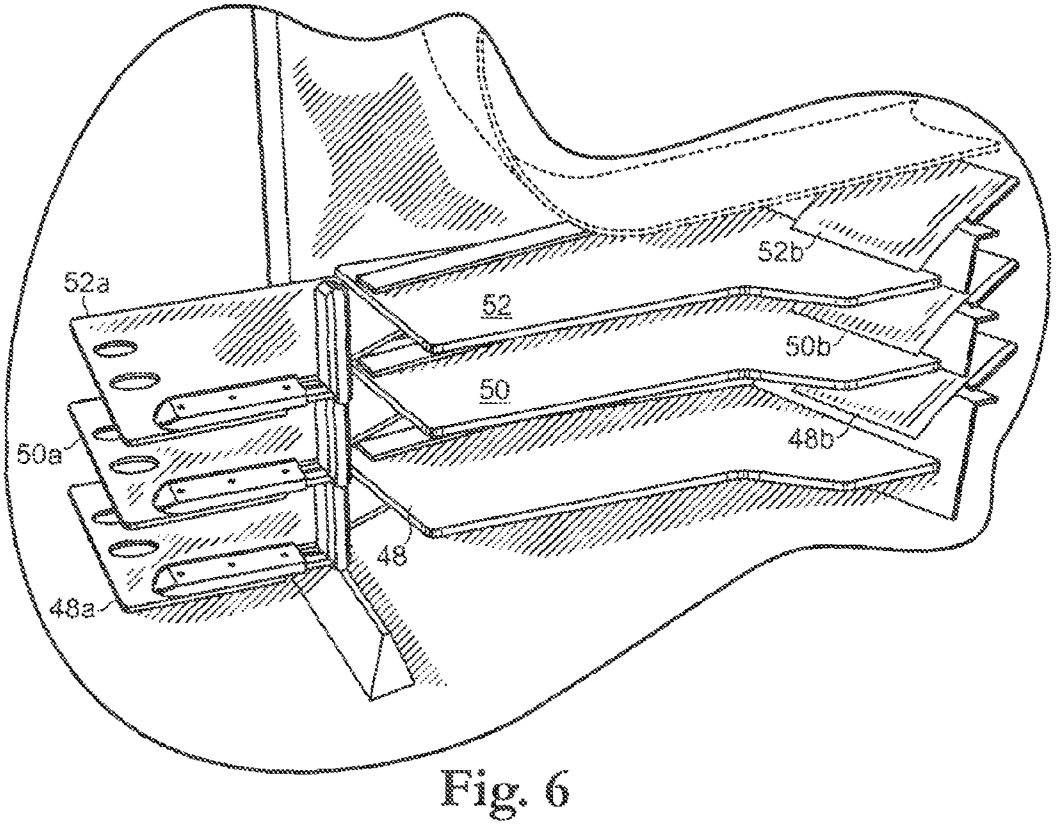
FIG. 6 is a close-up view of output bins of the system of FIG. 1.

As shown in FIG. 6, each output bin also has an extension tray 48*a*, 50*a* and 52*a* so that the output bins can receive larger ballots. Each output bin also has a ballot deflector 48*b*, 50*b* and 52*b* to prevent the trailing edge of a ballot deposited in one of the bins from catching the prevailing edge of the next ballot being deposited in the bin. The ballot deflectors 48*b*, 50*b* and 52*b* also reduce the free fall time of a ballot as it drops from diverter 18 to its respective output bin 48, 50 and 52 by supporting the ballot as it moves from diverter 18 to output bin 48, 50 and 52.

As shown in FIGS. 22, 23A-23B and 24, system 10 is capable of producing various output bin reports that include ballot information relating to the ballots in one or more of the output bins. Preferably, the output bin reports identify the ballot information in relation to the unique identification number printed on each of the ballots by ink cartridge 104, as discussed above with reference to FIG. 25. The output bin reports may be printed by one of printers 76 and 77, described below.

The "Ballots Scanned Report" of FIG. 22 is an exemplary output bin report that contains information relating to the ballots that were voted and scanned properly (which were directed to lower output bin 48). This report lists the Jurisdiction Name, Election Name, Election Date, Batch #, Total Ballots Scanned, Ballot # Range (i.e., the ballot numbers processed since the last report was printed), and time and date when the batch was started and completed. The report also lists, by precinct, the total number of ballots that were properly voted and scanned.

The "Ballots with Write Ins Report" of FIGS. 23A-23B is an exemplary output bin report that contains information relating to the ballots that included one or more write-in votes (which were directed to middle output bin 50). This report lists the Jurisdiction Name, Election Name, Election Date, Batch #, Ballot # Range, and time and date when the batch was started and completed, as well as the total number of ballots with write-in votes. The report lists by ballot identification number the number of write-ins votes that the ballot contains and which contests on the ballot contain the write-ins votes. For example, the report of FIG. 23A shows that Ballot #001258 contained a write-in vote for two contests, namely, the Presidential and Mayoral contests.

The "Ballots Not Scanned Report" of FIG. 24 is an exemplary output bin report that contains information relating to the ballots that were either improperly voted or improperly scanned (which were directed to upper output bin 52). This report also lists the Jurisdiction Name, Election Name, Election Date, Batch #, Ballot # Range, and time and date when the batch was started and completed. In addition, the report lists the total number of ballots that were not scanned or voted properly. For each ballot that was improperly scanned or voted, the report lists by ballot identification number the reason(s) why the ballot was rejected and, if applicable, the specific contest containing the error. A ballot may be rejected because it includes a voting irregularity associated with a contest on the ballot, such as a write-in vote, an undervote, an overvote or a blank ballot. A ballot may also be rejected because it is associated with a processing error, such as a read error, an invalid identification code (e.g., the code marks used to determine the ballot style of a ballot), or a double feed error. For example, the report of FIG. 24 shows that Ballot #001258 was improperly voted because of an "Overvote" in the Presidential contest, while Ballot #001489 was improperly scanned because of a "Read Error."

The output bin reports assist an election adjudication team tasked with reviewing the results of an election, because they allow the team to easily determine which ballots need to be reviewed and the reason or reasons why those ballots need to be reviewed. Further, these reports identify by ballot identification number which ballots have write-in votes or other voting irregularities, as well as ballots associated with processing errors, to assist the team in locating and reviewing the particular ballots identified on the reports. For example, if the team is able to locate and determine voter intent for a rejected ballot, then a new ballot may be marked to reflect that voter intent for processing by the system.

Referring to FIGS. 2 and 8, ballots moving through the system are tracked through the use of through-beam light sensors 58*a-k* positioned along the input area 12, transport path 16 and output area 20 so that any particular ballot is able to be sensed by at least one of the sensors. Although FIGS. 2 and 8 show eleven sensors 58*a-k*, it is within the scope of the present invention for the system to incorporate more or fewer sensors than shown in the drawings.

As shown in FIG. 2, sensors 58*a* and 58*b* are mounted to back plane 56 adjacent to pick-up mechanism 26. Preferably, sensor 58*a* detects when there are no more ballots in input hopper 24. Preferably, sensor 58*b* detects the trailing edge of a ballot exiting pick-up mechanism 26 so that the system knows when the next ballot can be picked from the ballot stack. Another sensor 180 is mounted in upper housing 42*a* to detect whether more than one ballot at a time passed between cameras 44 and 46. If sensor 180 detects more than one ballot, then the system tracks those ballots through transport path 16 and diverts them to the output bin designated for improperly scanned ballots, as described above.

There are also through-beam light sensors positioned adjacent to input hopper 24 for determining when hopper tray 24*a* is raised to its highest position and lowered to its lowest position. These sensors allow the system to stop movement of screw actuator 182 when hopper tray 24*a* is raised to its highest position or lowered to its lowest position. Similar light sensors are also positioned adjacent to the bottom output bin 48 for determining when it is in its highest position and its lowest position.

It should be understood that system 10 described above is relatively compact compared to conventional ballot processing systems. Referring to FIG. 2, system 10 preferably has a height H1 measured from the top to the bottom of backplane 56 of between approximately 25 to 45 inches, and most preferably approximately 36 inches. Also, system 10 preferably has a width W measured from the left to the right side of backplane 56 of between approximately 30 to 50 inches, and most preferably approximately 41 inches. In addition, system 10 preferably has a depth of between approximately 15 to 35 inches, and most preferably approximately 21 inches. As such, system 10 does not occupy much space and can be moved or transported to another location with relative ease.

Figure 13:
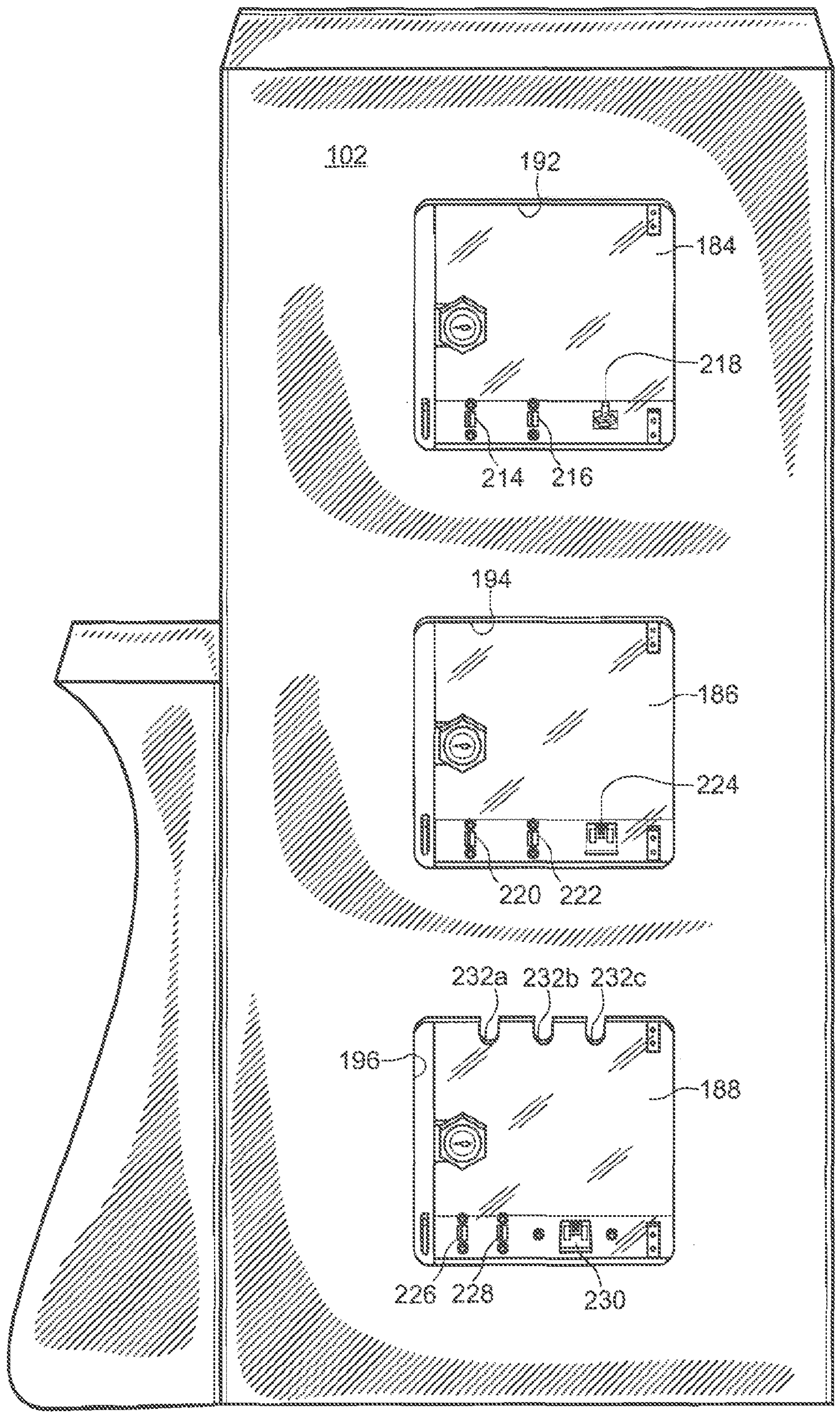
FIG. 13 is a close-up view of a side wall of the system of FIG. 1 showing transparent security doors that cover recesses in the side wall.
Figure 14:
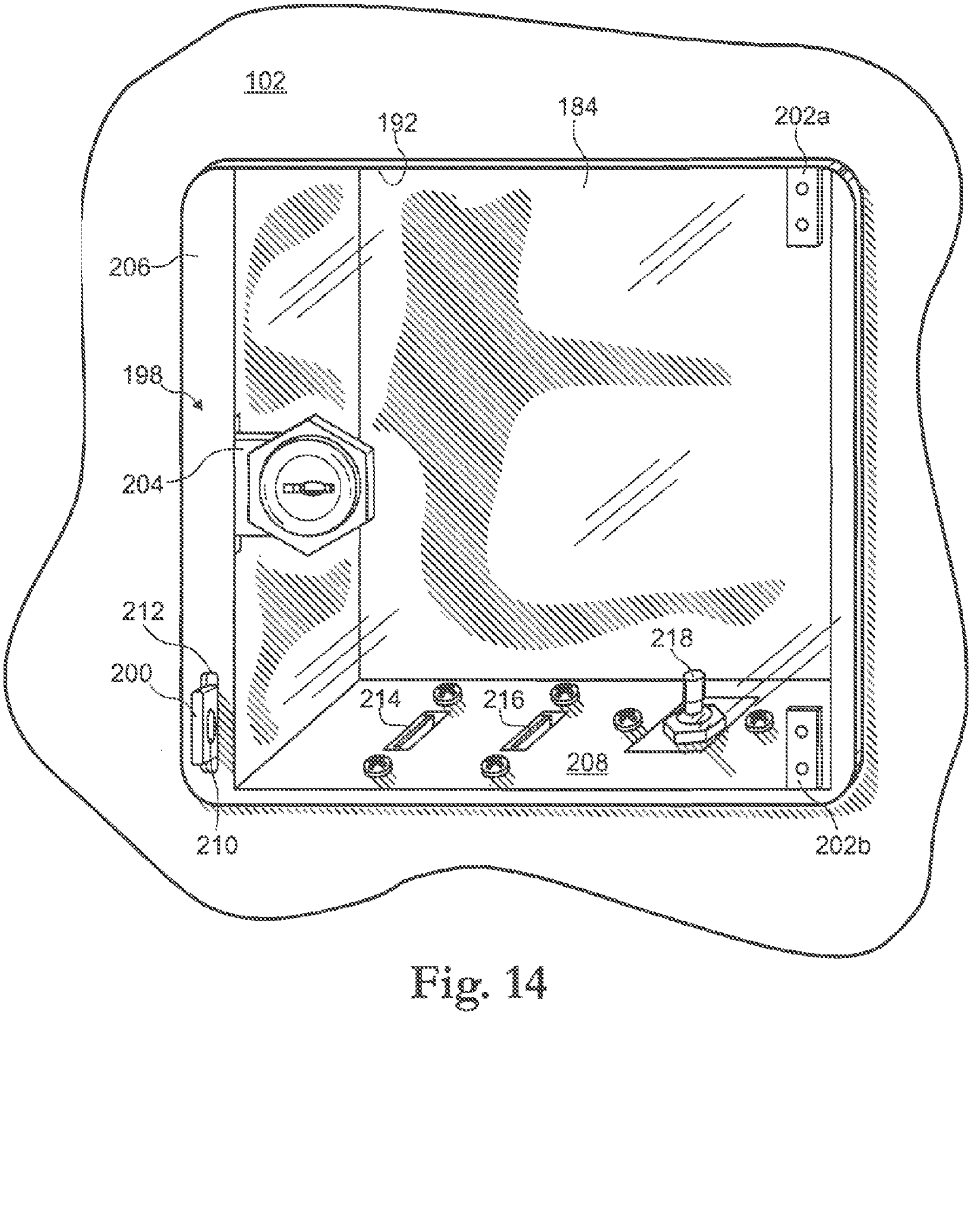
FIG. 14 is a close-up view of one of the transparent security doors shown in FIG. 13.
Figure 15:
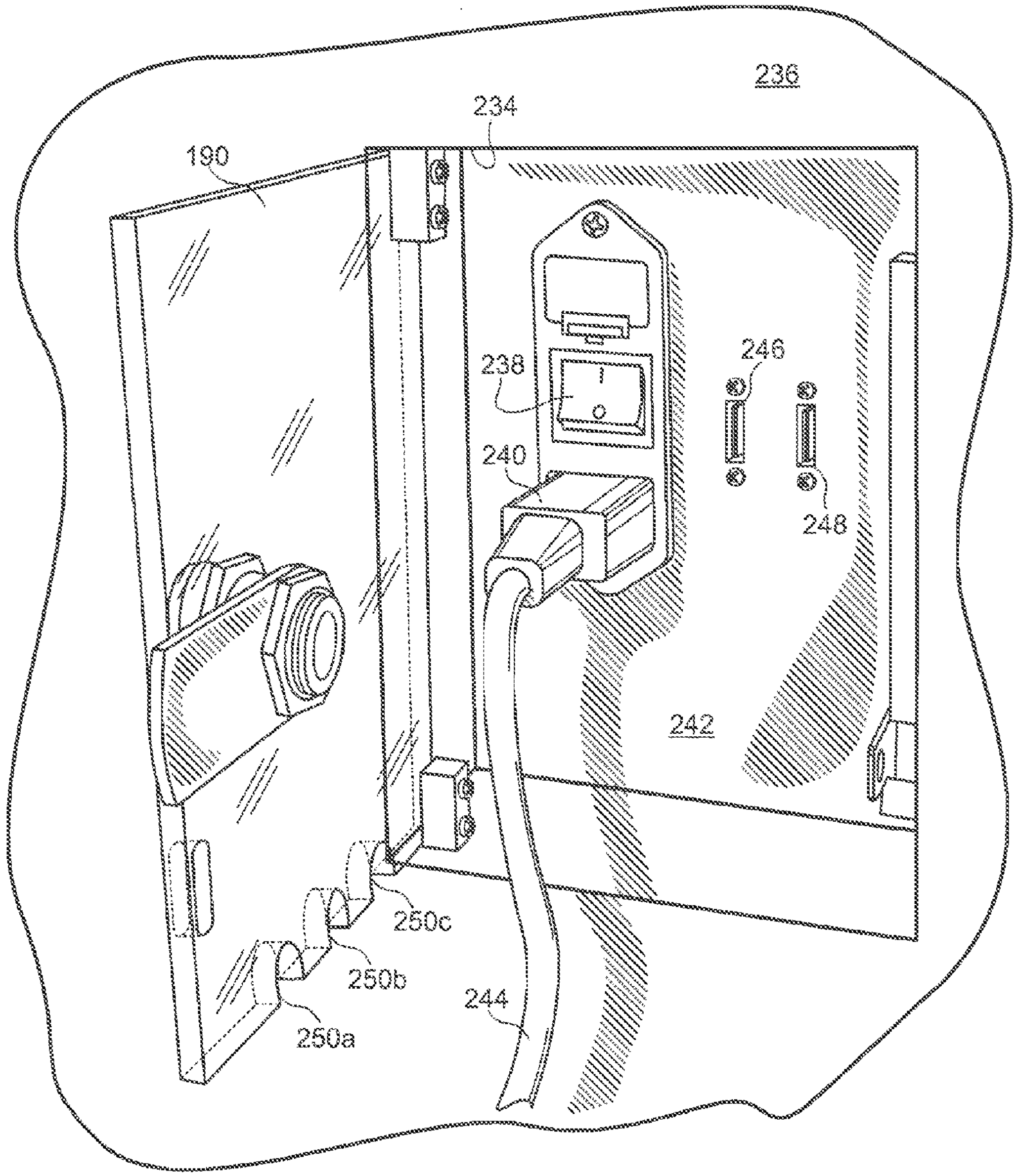
FIG. 15 is a close-up view of a power switch covered by one of the transparent security doors shown in FIG. 13.
Figure 16A:
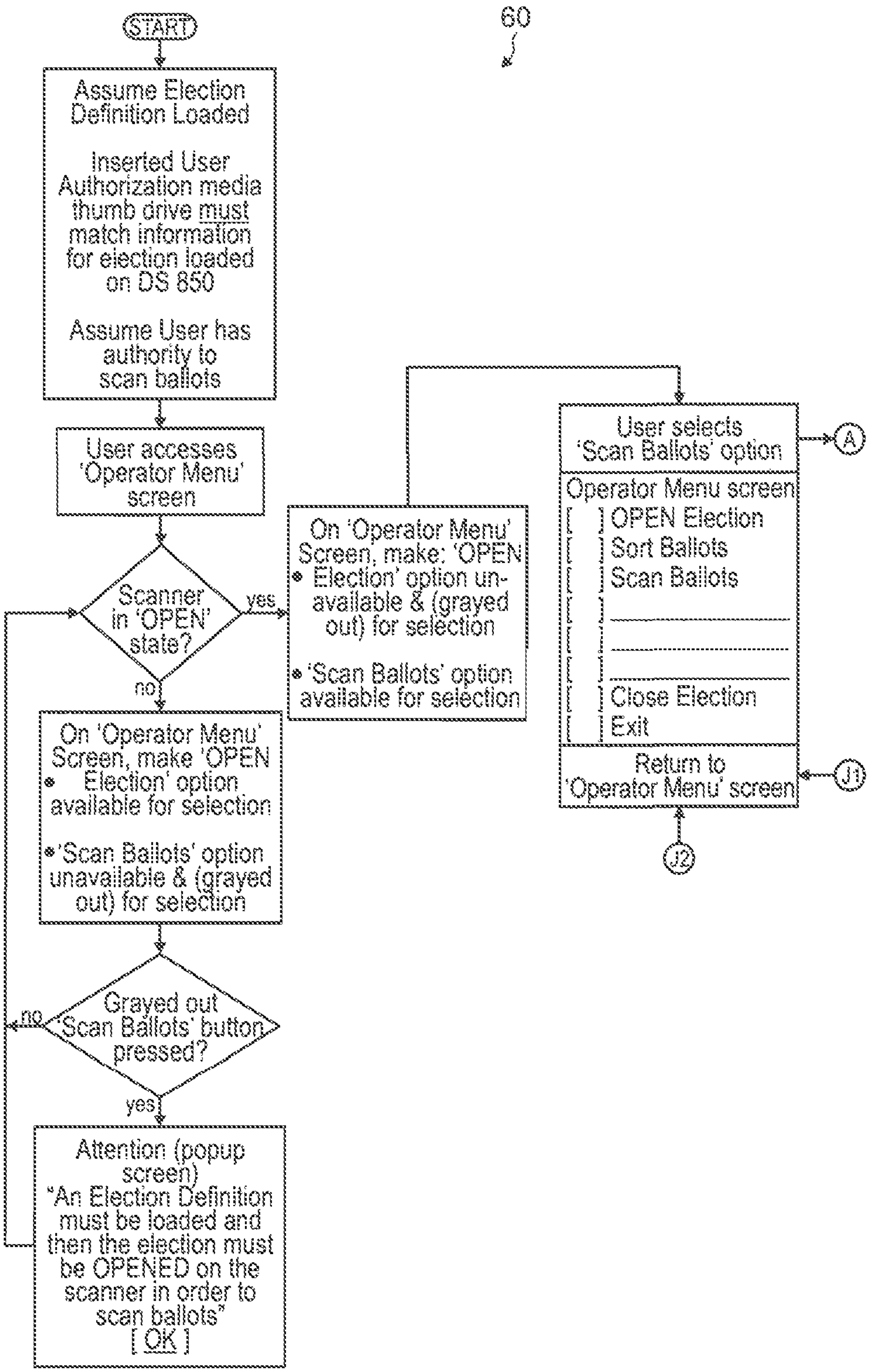
FIGS. 16A-16D are flow charts of the ballot scanning process for the system of FIG. 1.
Figure 16B:
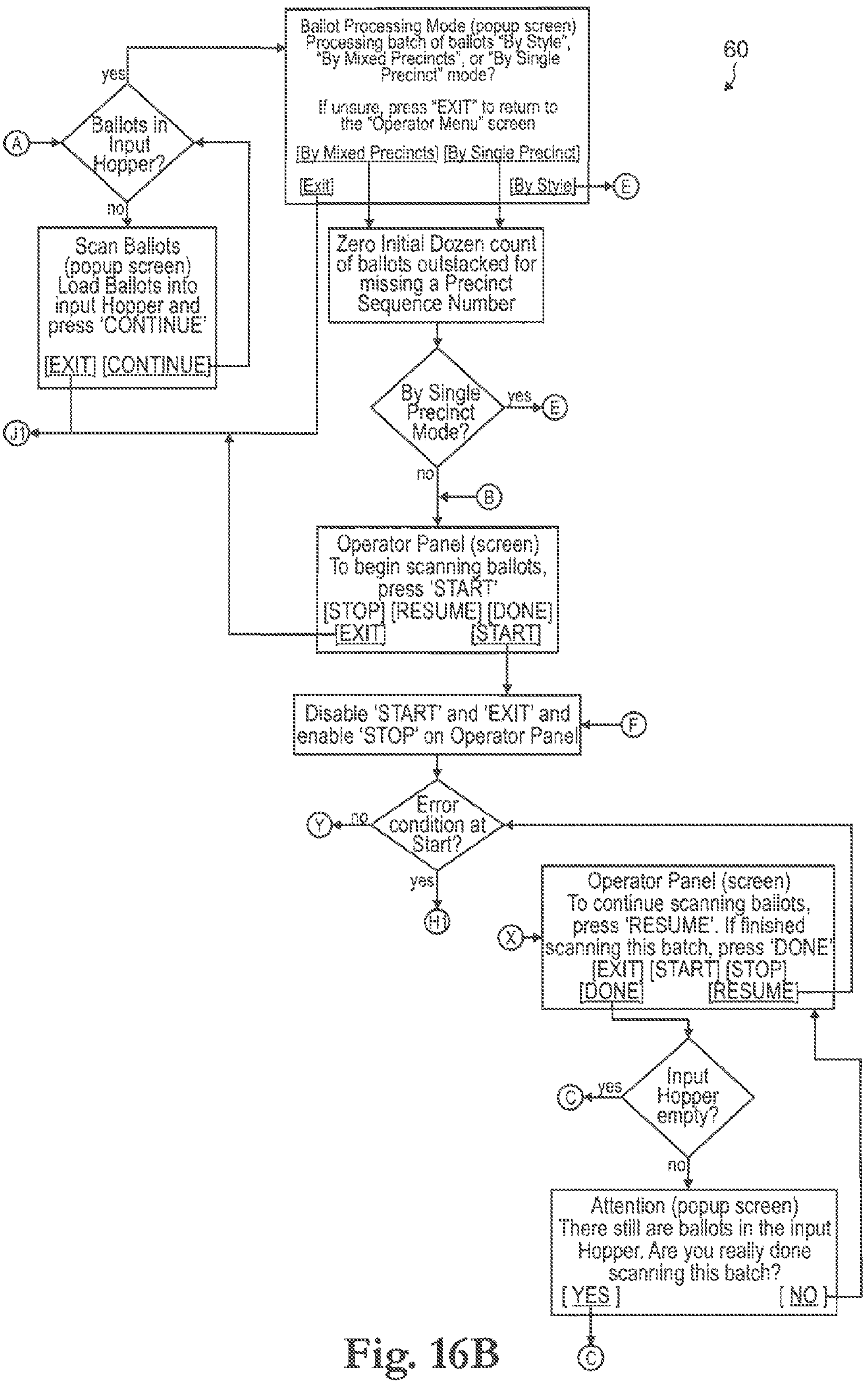
Figure 16C:
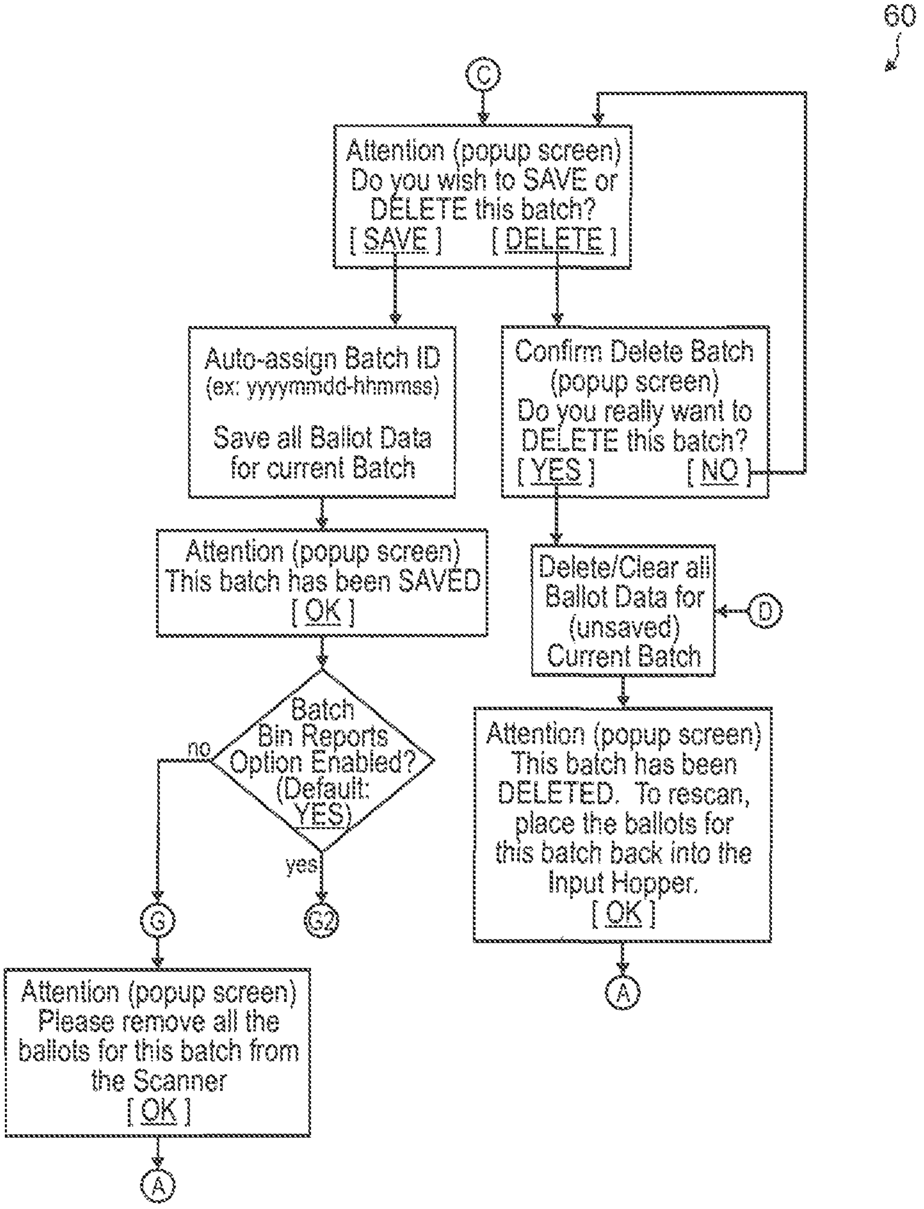
Figure 16D:
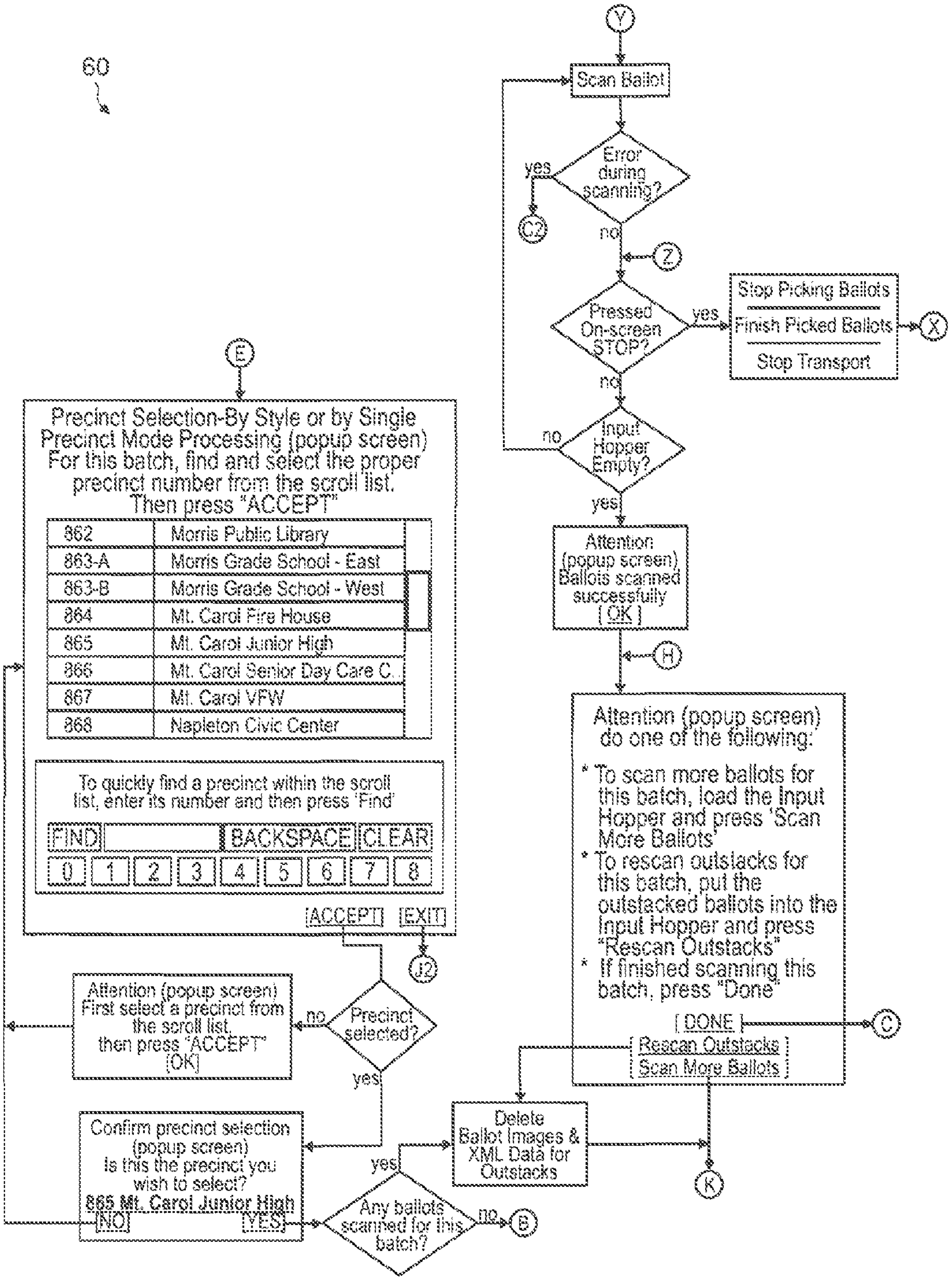

Referring to FIGS. 13-15, system 10 includes four transparent security doors 184, 186, 188 and 190 so that a user of the system can verify that all of the necessary memory devices are present and the power is turned on. Security doors 184, 186 and 188 are mounted so as to cover recesses 192, 194 and 196 formed in side wall 102 of system 10. Each transparent security door is made from a transparent material that is thick enough to prevent breaking. Preferably, each security door is made from a transparent polymeric material such as Plexiglas; however, the doors may also be made from glass. Security doors 184, 186, 188 and 190 allow election workers to install the memory devices or other items necessary for operation of the election machine, and allow the operators to verify that the devices are in place, without unlocking the doors and breaking their seals.

Because the locking mechanisms, hinges, and seal receiving structures of security doors 184, 186, 188 and 190 are substantially similar, only the locking mechanism 198, seal receiving structure 200, and hinges 202*a,b* of door 184 are described in detail herein. Locking mechanism 198 is mounted within an aperture in door 184. Locking mechanism 198 is operated by a key, which rotates a latch 204 between locked and unlocked positions. FIG. 14 shows latch 204 in its locked position, wherein latch 204 extends behind a portion 206 of side wall 102 preventing door 184 from opening. Door 184 is mounted to a bottom wall 208 with a hinge 202*b* that is secured to the door with fasteners and that is rotatably attached to bottom wall 208. The door is also mounted to a top wall opposite bottom wall 208 with a hinge 202*a* that is secured to the door and top wall in the same manner as hinge 202*b*. Seal receiving structure 200 extends outward from side wall portion 206 and has an opening 210 to receive a wire or ribbon type seal. There is an opening 212 in door 184 to receive seal receiving structure 200 when door 184 is in its closed position, as shown in FIG. 14, such that when door 184 is closed and a seal is received by structure 200, the door cannot be opened without breaking the seal.

There are two USB ports 214 and 216 mounted to bottom wall 208. There is also a switch 218 mounted to the bottom wall, which may be programmed to have any desirable function. Alternatively, switch 218 may be excluded from system 10 and replaced with additional USB ports or an RJ45 connector. USB ports 214 and 216 may receive removable memory devices, such as memory device 78 (FIG. 21), that contain information necessary for the operation of system 10. For example, one or both of ports 214 and 216 may receive a USB memory device containing the election ballot definition, as is known in the art. USB ports 214 and 216 may also be used to connect other devices to system 10, such as a computer mouse, keyboard, and printer. As shown in FIG. 13, there are two additional USB ports 220 and 222 and a RJ45 connector 224 mounted within recess 194 and two USB ports 226 and 228 and a RJ45 connector 230 mounted within recess 196. USB ports 220, 222, 226 and 228 may receive any of the devices described above for ports 214 and 216, while RJ45 connectors 224 and 230 may be used to connect system 10 to network 75 (FIG. 21), which could be another computer, a network of computers, and/or another ballot processing system that is identical or substantially identical to system 10 described herein. There are three slots 232*a*, 232*b* and 232*c* formed in the top of door 188 to allow cables to pass through the door when in the closed position.

Referring now to FIG. 15, door 190 is mounted to cover a recess 234 formed in a side wall 236 (FIG. 1) of the system, which is opposite side wall 102. There is a switch 238 and an electrical outlet 240 mounted to the back wall 242 that forms recess 234. Preferably, switch 238 is operable to turn the system on and off, while outlet 240 receives an electrical cord 244 that plugs into an electrical power source for providing power to the system. There are also two USB ports 246 and 248 mounted to back wall 242 that may receive any of the devices described above for ports 214 and 216. There are three slots 250*a*, 250*b* and 250*c* in the bottom of door 190 for allowing cables to pass through the door when in the closed position. The other features of door 190 are identical to those of door 184, which is described in detail above.

Figure 17A:
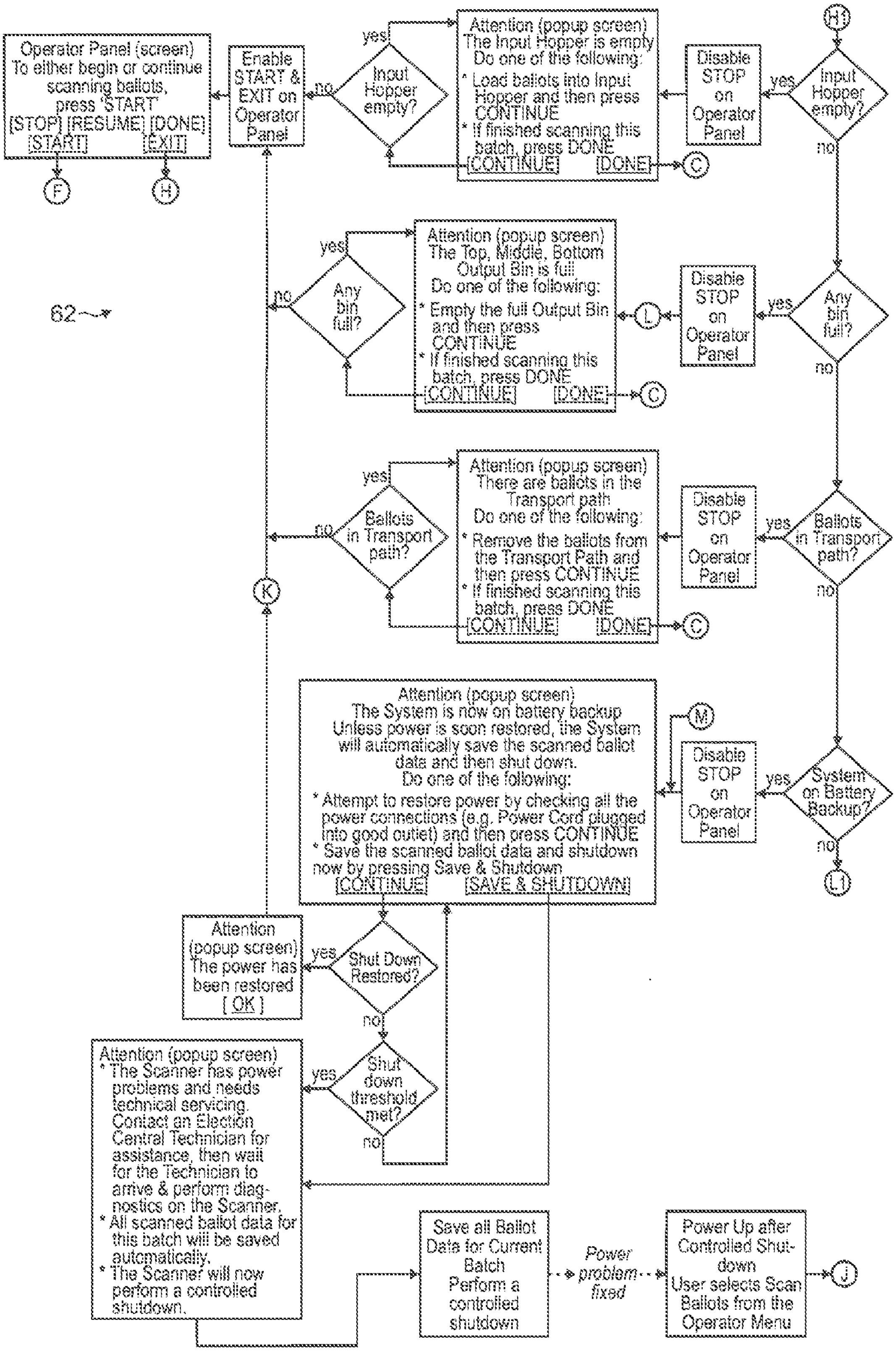
FIGS. 17A-17B are flow charts of the process for resolving start error conditions for the system of FIG. 1.
Figure 17B:
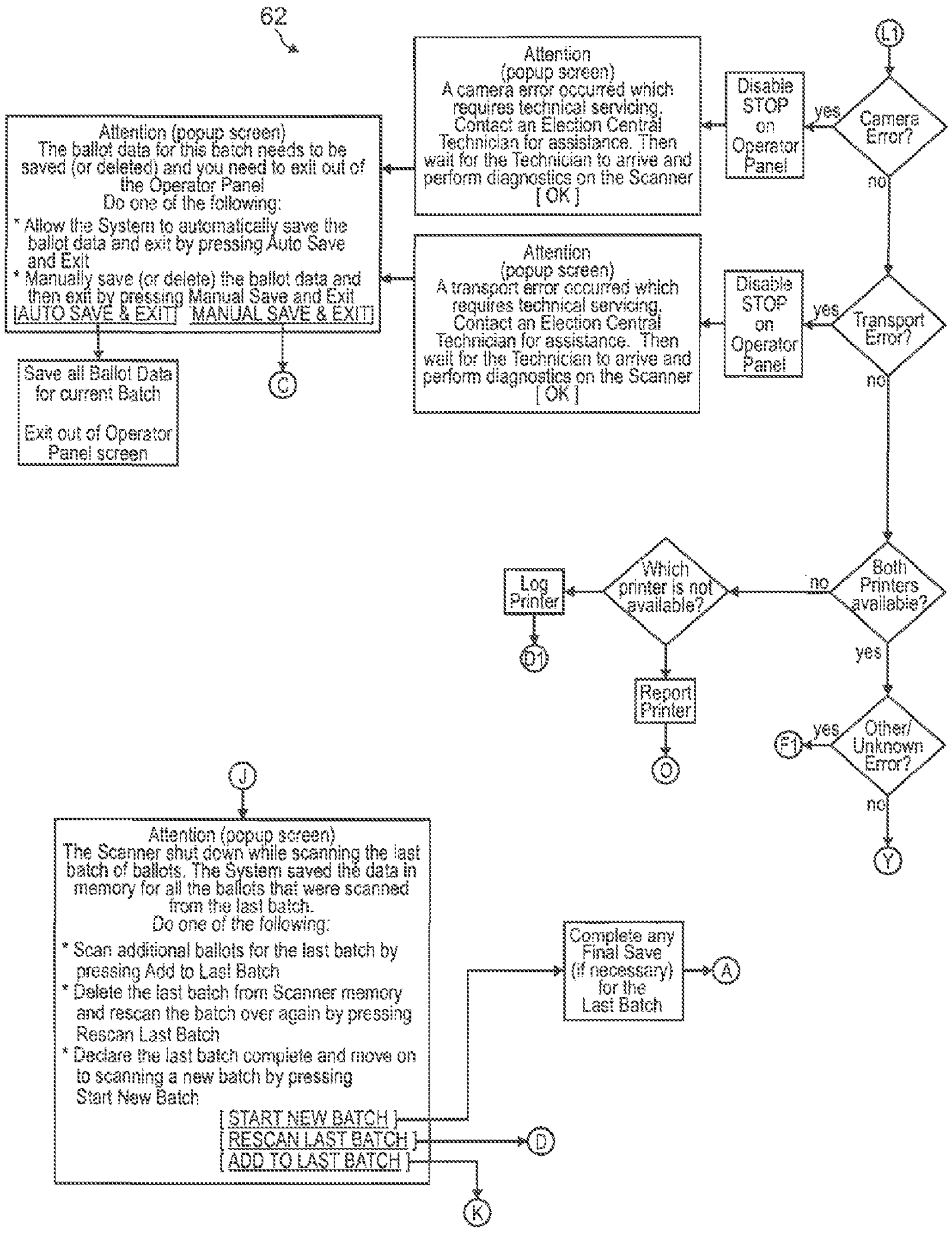
Figure 18A:
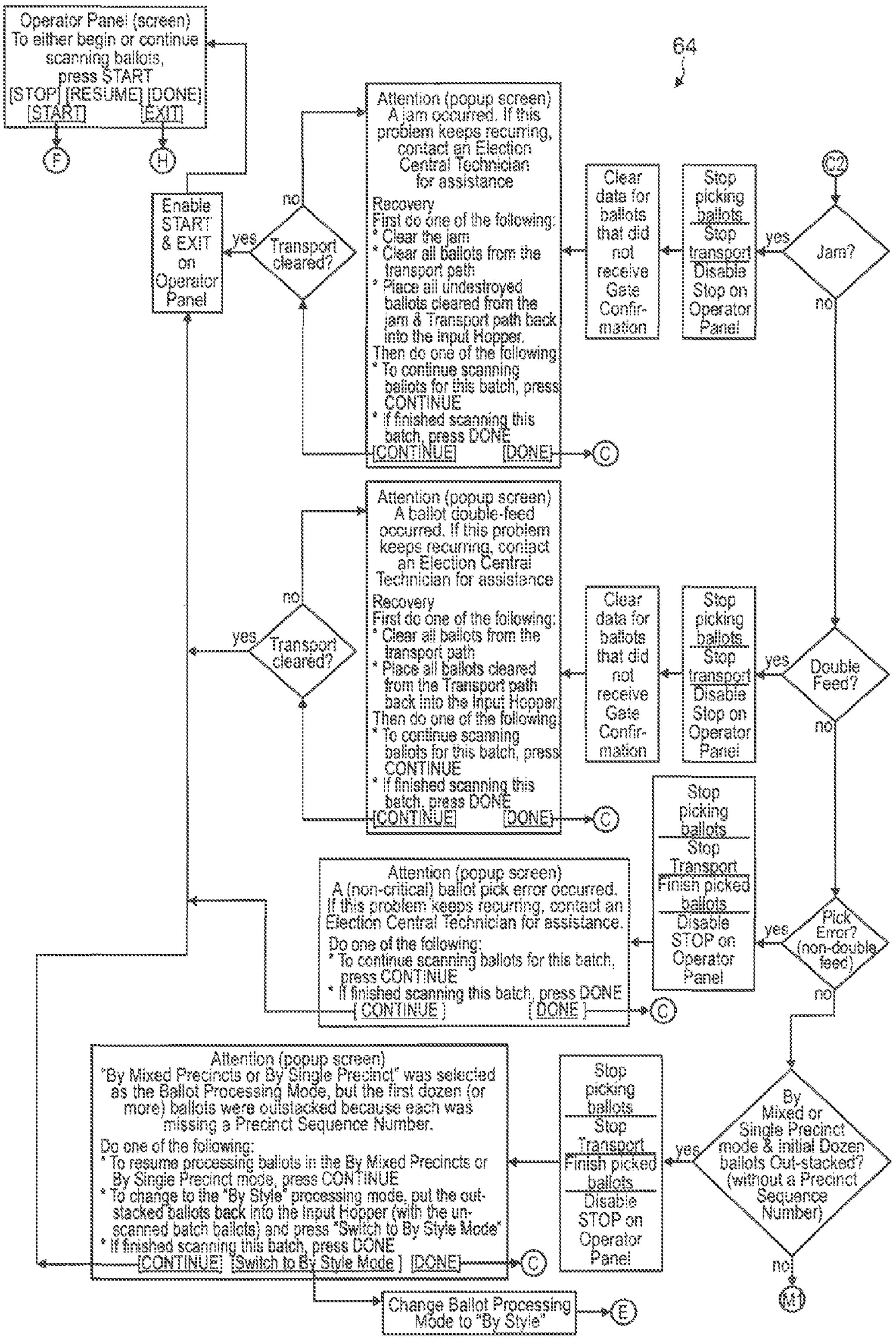
FIGS. 18A-18B are flow charts of the process for resolving scanning error conditions and the process for printing batch bin reports for the system of FIG. 1.
Figure 18B:
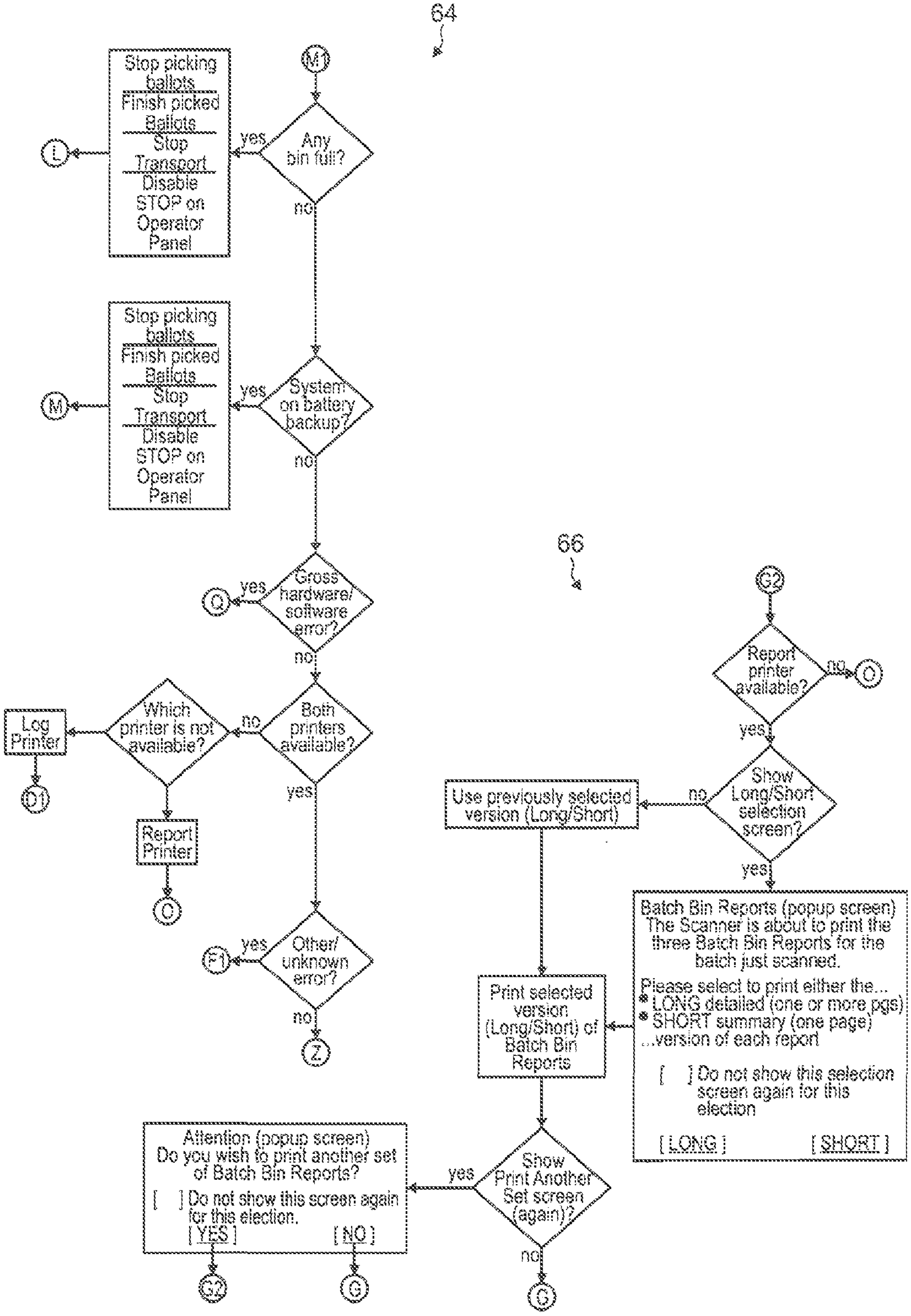
Figure 19A:
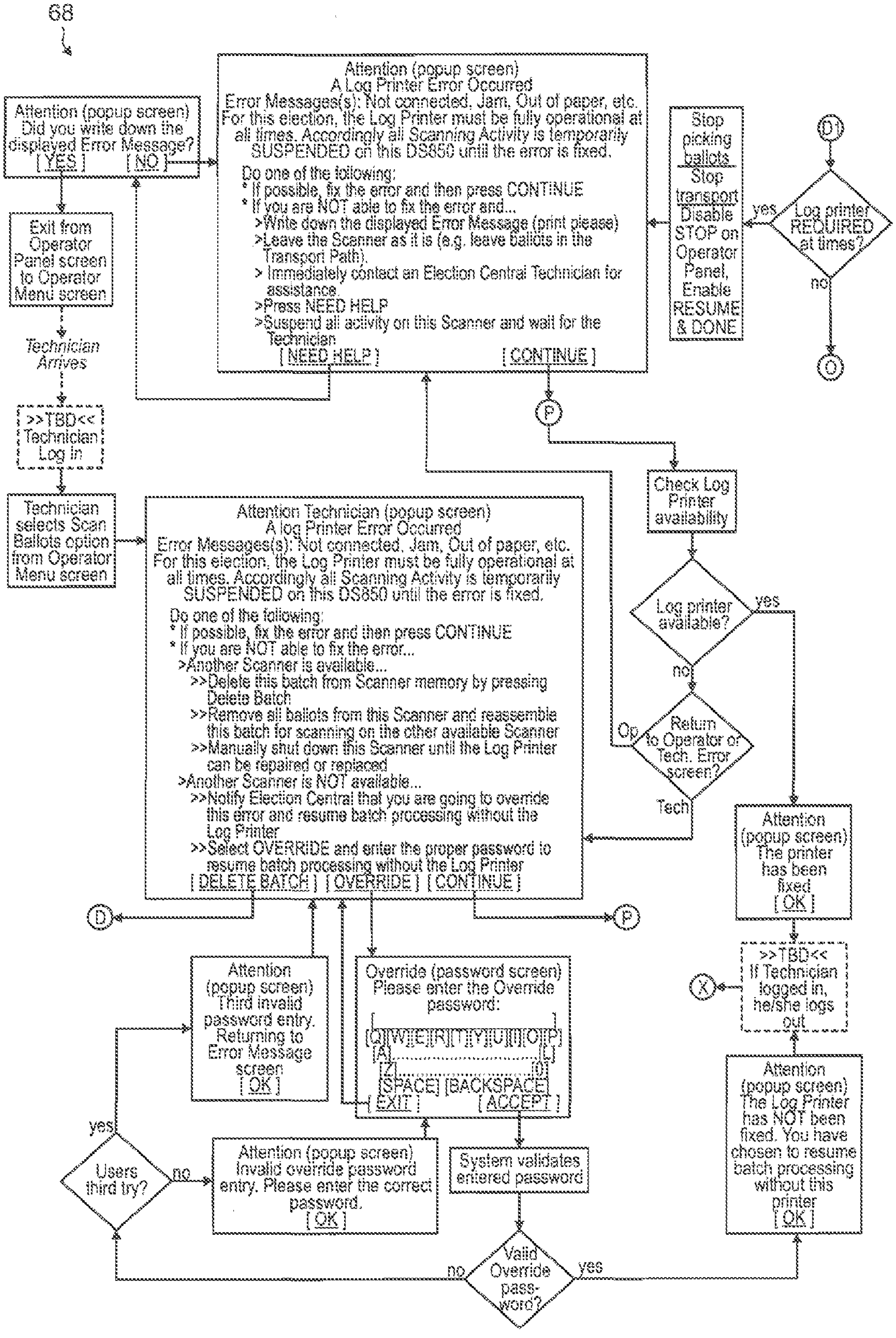
FIGS. 19A-19B are flow charts of the process for resolving the situation when the log/report printer is not available for the system of FIG. 1.
Figure 19B:
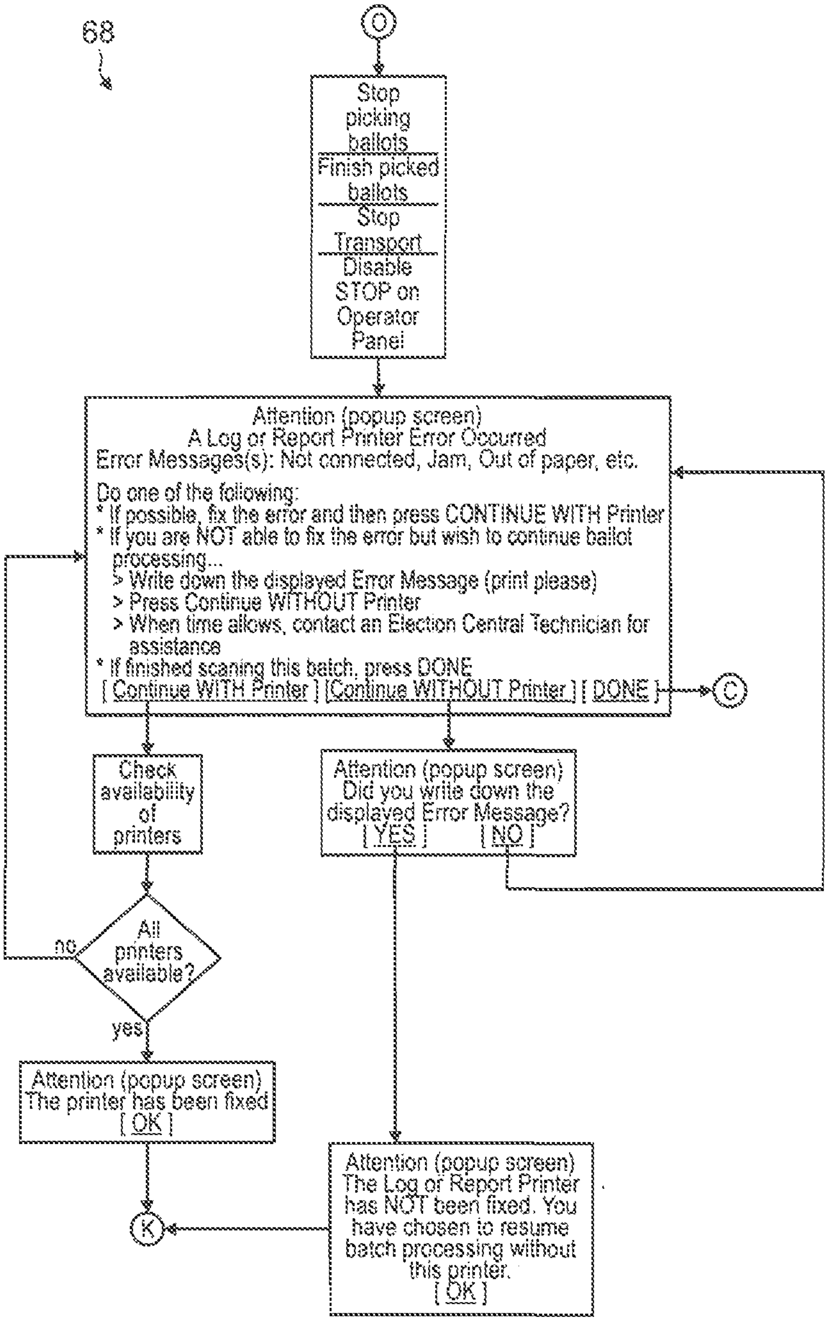
Figure 20:
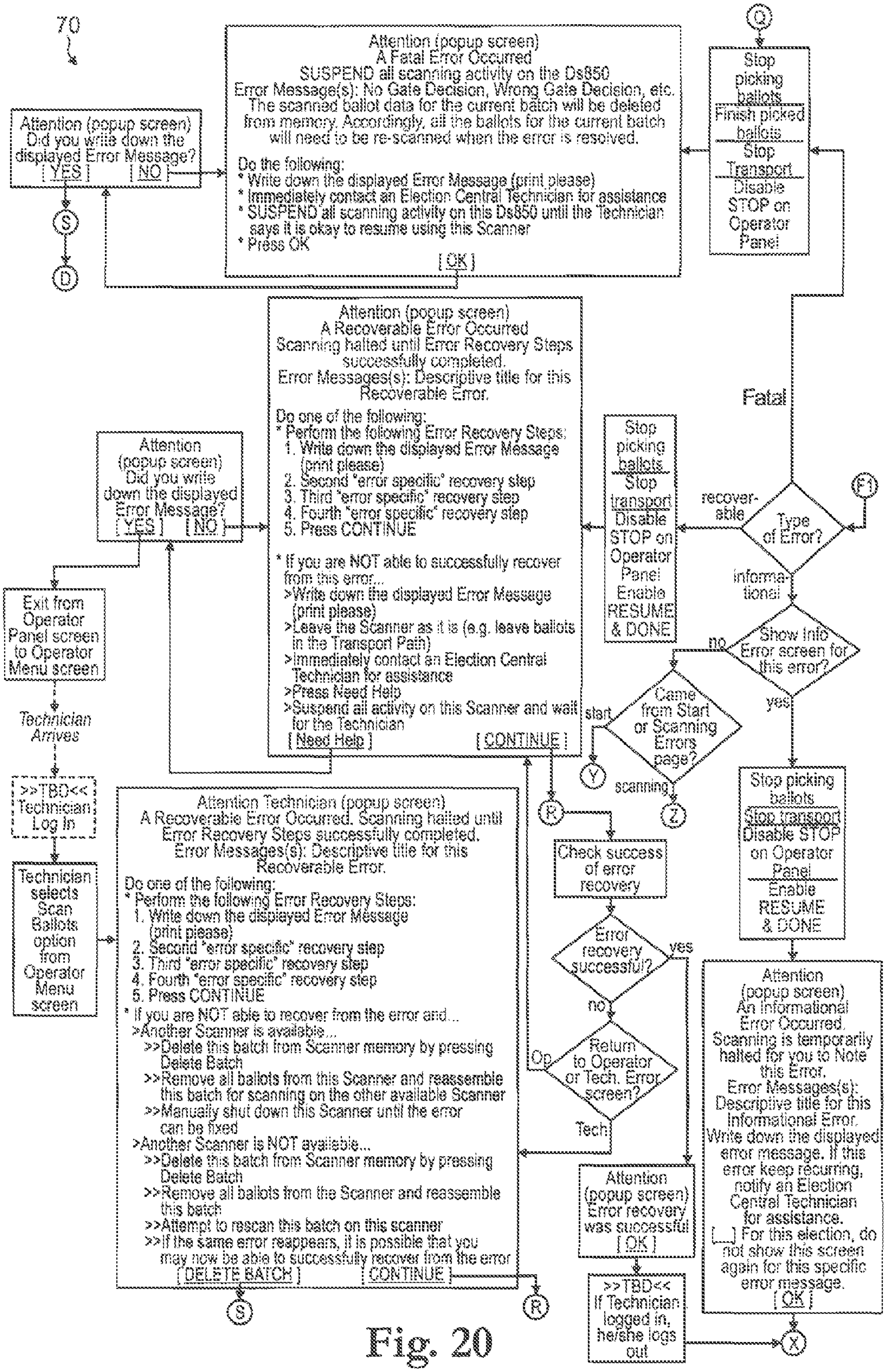
FIG. 20 is a flow chart of the process for resolving an unknown error for the system of FIG. 1.

Referring now to FIGS. 16A-16D, 17A-17B, 18A-18B, 19A-19B and 20, various flow charts are provided to illustrate the functionality of the application software of system 10 in connection with the processing of ballots as described herein. These flow charts also show the display screens that are displayed on user input device 22 at various times during the processing of a ballot. Specifically, FIGS. 16A-16D show a flow chart 60 of the ballot scanning process of system 10. FIGS. 17A-17B show a flow chart 62 of the process for resolving start error conditions for system 10. FIGS. 18A-18B show a flow chart 64 of the process for resolving scanning error conditions for system 10. FIG. 18B shows a flow chart 66 of the process for printing output bin reports for system 10. FIGS. 19A-19B show a flow chart 68 of the process for resolving the situation when a log printer or report printer is not available for system 10. FIG. 20 shows a flow chart 70 of the process for resolving an unknown error for system 10.

Figure 21:
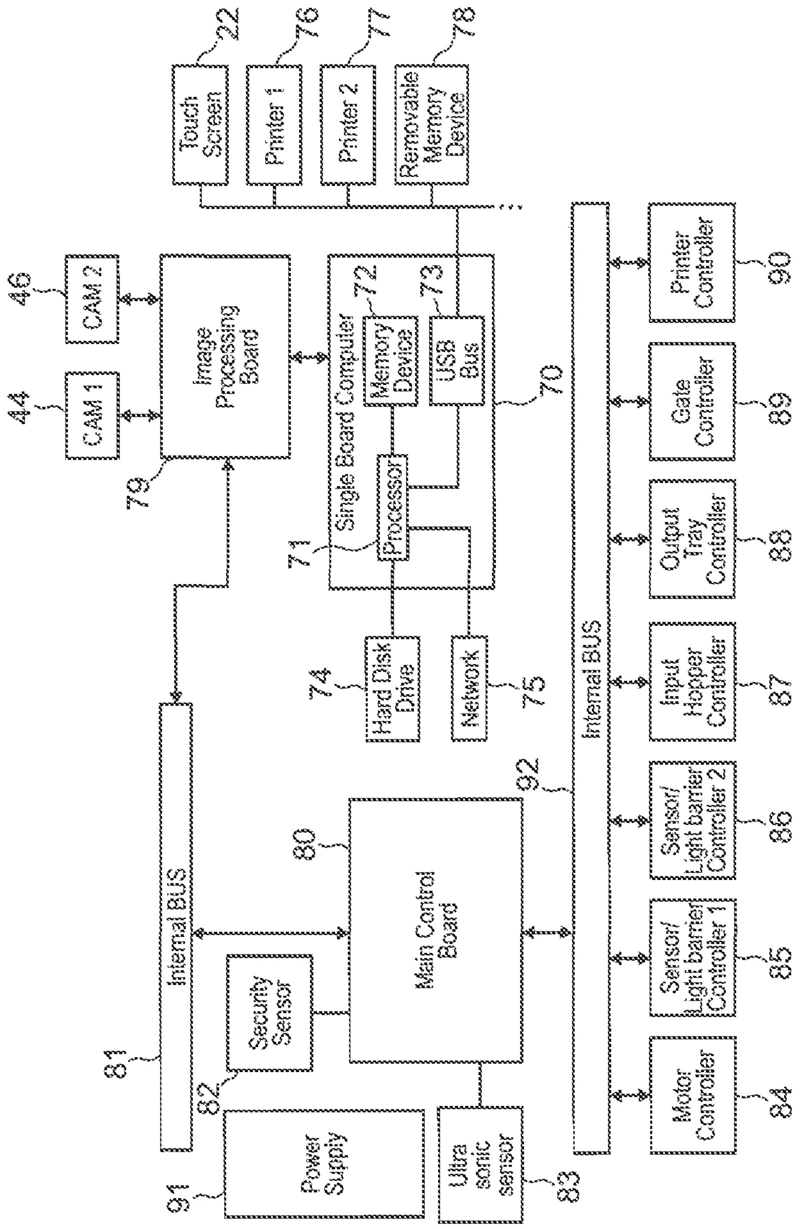
FIG. 21 is a block diagram of computer processors and controllers of the system of FIG. 1.

Referring now to FIG. 21, a block diagram is provided of the hardware incorporated into system 10. As can be seen, system 10 includes a single board computer 70 with a processor 71 connected to a memory device 72, which is preferably random access memory (RAM), and a USB bus 73. The processor 71 is also connected to a hard disk drive 74 and, if desired, may be connected to a network 75 of other computers. The USB bus 73 is connected to a user input device/touch screen 22, a first printer 76, a second printer 77, and a removable memory device 78. The printers 76 and 77 may be used to print a wide variety of system and diagnostic reports, including the output bin reports shown in FIGS. 22-24. In the exemplary embodiment, one of the printers is a continuous feed dot matrix printer for printing an audit log, and the other is a cut-sheet laser printer for printing reports. Other devices may also connect to the USB bus 73 if desired. The hard disk drive 74 preferably stores the application software that is executed by processor 71 to perform the various functions of system 10 described herein.

The single board computer 70 is connected to an image processing board 79 via a USB connection that communicates with two cameras 44 and 46. The image processing board 79 transfers the ballot images to the single board computer 70, which stores them on hard disk drive 74. The memory device 72 may also be used to temporarily store data before it is transferred to hard disk drive 74. The election ballot definition is preferably transferred to the single board computer 70 via the removable memory device 78 and stored on hard disk drive 74. The removable memory device 78 preferably connects to the USB bus 73 through one of the USB ports described above and shown in FIGS. 13-15.

The image processing board 79 is connected to a main control board 80 via an internal bus 81. The main control board 80 is connected to the following controllers via an internal bus 92: a motor controller 84, a first sensor/light barrier controller 85, a second sensor/light barrier controller 86, an input hopper controller 87, an output tray controller 88, a gate controller 89, and a printer controller 90. The main control board 80 also monitors the full sensors of output trays 50 and 52. The motor controller 84 is connected to a main motor 148 (FIG. 9), which provides power to the rollers and to a pinwheel sensor that detects whether main motor 148 is operating correctly. The first and second sensor/light barrier controllers 85 and 86 are each connected to one or more of sensors 58*a-k*. The input hopper controller 87 is connected to screw actuator 182 (FIG. 9) for moving input hopper 24 as described above, and also monitors the maximum up and down position sensors for this tray. The output tray controller 88 is connected to screw actuator 59 (FIG. 9) for moving the lower output tray 48, and also monitors the maximum up and down position sensors for this tray. The gate controller 89 is connected to the clutch on flywheel 40 for controlling the rate at which ballots are picked from the ballot stack by pick-up mechanism 26. The gate controller 89 is connected to shunts 112 and 114 of diverter 18 (FIG. 8) for directing ballots into the appropriate output bin 48, 50 or 52. The printer controller 90 is connected to ink cartridge 104 (FIG. 2) for printing identifying marks on ballots scanned by system 10. To isolate system noise, system 10 uses three separate power supplies. A first power supply is used to power the transport mechanical controls board, input and output tray motors, and the cameras.

A second power supply is used to power only the main motor. A third power supply is used to power the computer motherboard, the hard drive, and the display.

The main control board 80 is connected to a security sensor 82 that is positioned within the transport path to detect copied or counterfeit ballots. Upon detection of a copied or counterfeit ballot, the main control board 80 instructs the image processing board 79 and single board computer 70 to flag that particular ballot. An ultrasonic sensor 83 is also connected to the main control board 80. The ultrasonic sensor 83 is used to detect whether more than one ballot is passing through imaging area 14. If more than one ballot passes through imaging area 14, the main control board 80 can instruct the image processing board 79 and single board computer 70 to flag those particular ballots and route them to output bin 52 (i.e., the output bin designated for improperly scanned ballots).

Operation of the System

In operation, a stack of ballots are placed in input hopper 24 whereby pick-up mechanism 26 picks the top ballot from the stack and transfers it to imaging area 14. Cameras 44 and 46 image both sides of the ballot and send the ballot image to the image processing board 79 (FIG. 21). As the ballot is transported from imaging area 14 to diverter 18 through transport path 16, the image processing board 79 sends the ballot image to the single board computer 70, which temporarily stores the ballot image in memory device 72 or on hard disk drive 74. The processor 71 utilizes the election ballot definition to process the ballot image and determine the voting selections marked on the ballot, preferably as described in U.S. Pat. No. 6,854,644, which is incorporated herein by reference. The processor 71 then creates a ballot record that contains the processing results and stores the file in either memory device 72 or hard disk drive 74 along with the ballot image. After a batch of ballots is processed, all of the ballot records and ballot images are permanently stored on hard disk drive 74 and digitally signed to ensure authenticity.

Based on the processing results for the ballot, the processor 71 determines which position the shunts 112 and 114 of diverter 18 need to be moved in order to divert the ballot into the appropriate output bin 48, 50 or 52. The processor 71 sends instructions to the gate controller 89 to move the shunts 112 and 114 into the appropriate position. The sensors 58*a-k* (FIGS. 2 and 8) positioned along the ballot transport path are connected to the main control board 80, image processing board 79, and single board computer 70 via sensor/light barrier controllers 85 and 86 in order to track each ballot through transport path 16 and ensure that each ballot is diverted into the correct output bin 48, 50 or 52.

This process repeats for each ballot in input hopper 24 as the processor 71 sends instructions through the main control board 80 to the gate controller 89, causing the electronically controlled clutch to rapidly engage and disengage flywheel 40 from drive shaft 38 to pick up ballots at the desired speed. Preferably, the ballots are transported from input hopper 24 to diverter 18 at a speed of between approximately 50 to 120 inches per second. Preferably, up to four ballots may be positioned within imaging area 14 and transport path 16 at any given time.

Finally, system 10 automatically determines whether the results of newly scanned ballots should be added to a preexisting election results database, or, whether the results of the newly scanned ballots should replace the results in the preexisting database. This determination is made based on date/time stamps that are added to every ballot record and ballot image. For every batch of scanned ballots, the system saves a date/time stamp of when the first ballot was scanned and when the last ballot was scanned to establish a session window for that batch of ballots. The date/time stamps are saved along with the machine identification in a results collection file, which is encrypted and signed to prevent tampering.

For example, if the date/time stamp of the first ballot in the newly scanned ballots is the same as the date/time stamp of the first ballot of the original results and the date/time stamp of the last ballot in the newly scanned ballots is later than the date/time stamp of the last ballot of the original results, then system 10 will replace the original results with the results of the newly scanned ballots. However, if the date/time stamp of the first ballot in the newly scanned ballots is later than the date/time stamp of the last ballot of the original results, then system 10 will add the results of the newly scanned ballots to the original results. System 10 is also able to determine what cause of action to take if the date/time stamps of the various files are different than in the two scenarios described above. Thus, system 10 eliminates the requirement for an "add to" or "replace" prompt associated with the election results database, and, eliminates the possibility of user error.

While the present invention has been described and illustrated hereinabove with reference to an exemplary embodiment, it should be understood that various modifications could be made to this embodiment without departing from the scope of the invention. In addition, it should be understood that the exemplary embodiment embodies different inventive features. One skilled in the art will appreciate that any one of these inventive features could be implemented without the others. Therefore, the present invention is not to be limited to the specific configuration or methodology of the exemplary embodiment, except insofar as such limitations are included in the following claims.

What is claimed and desired to be secured by Letters Patent is as follows:

1. A system located at a central election office for processing a plurality of marked paper ballots having one or more voting selections selected by a voter marked thereon, comprising:

- an input area configured to receive a stack of marked ballots to be processed;
- a pick-up mechanism operable to pick each of the marked ballots from the stack;
- a printing device operable to print a unique identifier on each of the marked ballots picked by the pick-up mechanism from the stack;
- a processor operable to process each of the marked ballots picked by the pick-up mechanism from the stack to determine the voting selections marked thereon;
- an output area configured to store the processed ballots; and
- a printer operable to print at least one report that includes ballot information relating to a plurality of the processed ballots, wherein the report identifies the ballot information in relation to the unique identifier printed on each of the marked ballots.

2. The system of claim 1, wherein the processor is operable to generate the unique identifier for each of the ballots.

3. The system of claim 1, further comprising a memory device for storing the ballot information in relation to the unique identifier for each of the ballots.

4. The system of claim 1, further comprising a detector operable to detect the unique identifier printed on each of the ballots.

5. The system of claim 4, wherein the input area comprises an imaging device operable to produce an image of each of the ballots, and wherein the processor is operable process the image of each of the ballots to (1) determine the voting selections marked thereon and (2) detect the unique identifier printed thereon whereby the processor comprises the detector of the system.

6. The system of claim 1, wherein the printing device comprises an ink cartridge.

7. The system of claim 1, wherein each unique identifier comprises a unique string of alphanumeric characters.

8. The system of claim 7, wherein each unique identifier comprises a serial number of the ballot processing system and a unique index number.

9. The system of claim 1, wherein each unique identifier is printed in a black color.

10. The system of claim 1, wherein each unique identifier is printed in a non-black color.

11. The system of claim 1, wherein the ballots may be processed during an initial count of the ballots or during a recount of the ballots, and wherein a first unique identifier is printed on each of the ballots during the initial count and wherein a second unique identifier is printed on each of the ballots during the recount.

12. The system of claim 11, wherein the first unique identifier is printed in a first color and the second unique identifier is printed in a second color.

13. The system of claim 11, further comprising a detector operable to detect the first unique identifier on each of the ballots during the recount to verify that each of the ballots was processed during the initial count.

14. The system of claim 1, wherein the output area comprises a plurality of output bins.

15. The system of claim 14, wherein the output area comprises a diverter operable to divert each of the ballots into one of the output bins based on instructions received from the processor.

16. The system of claim 14, wherein one of the output bins stores ballots that include at least one write-in vote for a contest on the ballot, and wherein the ballot information on the report includes an identification of the contest containing the write-in vote in relation to the unique identifier for each of the ballots.

17. The system of claim 14, wherein one of the output bins stores ballots that include at least one voting irregularity associated with a contest on the ballot, and wherein the ballot information on the report includes an indication of the voting irregularity in relation to the unique identifier for each of the ballots.

18. The system of claim 17, wherein the voting irregularity is selected from the following group: an undervote, an overvote, and a blank ballot.

19. The system of claim 14, wherein one of the output bins stores ballots associated with a processing error, and wherein the ballot information on the report includes an indication of the processing error in relation to the unique identifier for each of the ballots.

20. The system of claim 19, wherein the processing error is selected from the following group: a read error, an invalid ballot identification code, and a double feed error.

21. A system located at a central election office for processing a plurality of marked paper ballots having one or more voting selections selected by a voter marked thereon, comprising:

- an input area configured to receive a stack of marked ballots to be processed;
- a pick-up mechanism operable to pick each of the marked ballots from the stack;
- a printing device operable to print an identifier on each of the marked ballots picked by the pick-up mechanism from the stack;
- a detector operable to detect the identifier printed on each of the marked ballots picked by the pick-up mechanism from the stack;
- a processor operable to process each of the marked ballots picked by the pick-up mechanism from the stack to determine the voting selections marked thereon; and
- an output area configured to store the processed ballots.

22. The system of claim 21, wherein the printing device is operable to print a first identifier on each of the ballots during an initial count of the ballots and a second identifier on each of the ballots during a recount of the ballots.

23. The system of claim 22, wherein the first identifier is printed in a first color and the second identifier is printed in a second color.

24. The system of claim 21, wherein the detector is operable to detect each identifier so as to verify that each of the ballots was processed during a previous count of the ballots.

25. The system of claim 21, wherein the detector is operable to detect each identifier so as to prevent double-processing of each of the ballots.

26. The system of claim 21, wherein each identifier comprises a unique string of alphanumeric characters.

27. The system of claim 26, wherein the processor is operable to generate each unique string of alphanumeric characters.

28. The system of claim 26, wherein each unique string of alphanumeric characters comprises a serial number of the ballot processing system and a unique index number.

29. The system of claim 21, wherein the input area comprises an imaging device operable to produce an image of each of the ballots, and wherein the processor is operable process the image of each of the ballots to (1) determine the voting selections marked thereon and (2) detect the identifier printed thereon whereby the processor comprises the detector of the system.

30. The system of claim 21, wherein the detector comprises a sensor operable to detect a color of the identifier.

31. The system of claim 21, wherein the detector comprises a sensor operable to detect a magnetic compound in ink used to print the identifier.

32. The system of claim 21, wherein the printing device comprises an ink cartridge.

33. The system of claim 21, wherein each identifier is printed in a black color.

34. The system of claim 21, wherein each identifier is printed in a non-black color.

35. The system of claim 21, wherein the output area comprises a plurality of output bins.

36. The system of claim 35, wherein each identifier comprises a unique identifier.

37. The system of claim 36, further comprising a printer operable to print at least one report that includes ballot information relating to at least a portion of the processed ballots, and wherein the report identifies the ballot information in relation to the unique identifier for each of the ballots.

38. The system of claim 37, wherein one of the output bins stores ballots that include at least one write-in vote for a contest on the ballot, and wherein the ballot information on the report includes an identification of the contest containing the write-in vote in relation to the unique identifier for each of the ballots.

39. The system of claim 37, wherein one of the output bins stores ballots that include at least one voting irregularity associated with a contest on the ballot, and wherein the ballot information on the report includes an indication of the voting irregularity in relation to the unique identifier for each of the ballots.

40. The system of claim 39, wherein the voting irregularity is selected from the following group: an undervote, an overvote, and a blank ballot.

41. The system of claim 37, wherein one of the output bins stores ballots associated with a processing error, and wherein the ballot information on the report includes an indication of the processing error in relation to the unique identifier for each of the ballots.

42. The system of claim 41, wherein the processing error is selected from the following group: a read error, an invalid ballot identification code, and a double feed error.

43. The system of claim 37, further comprising a memory device for storing the ballot information in relation to the unique identifier for each of the ballots.

44. A method for processing a plurality of marked paper ballots at a central election office, wherein each of the marked paper ballots has one or more voting selections selected by a voter marked thereon, comprising:

receiving a stack of marked ballots to be processed;

processing each of the marked ballots in the stack by:

(a) printing a unique identifier on the marked ballot;

(b) determining the voting selections marked on the ballot;

(c) storing the marked ballot; and printing at least one report that includes ballot information relating to a plurality of the marked ballots, wherein the report identifies the ballot information in relation to the unique identifier printed on each of the marked ballots.

45. The method of claim 44, further comprising generating the unique identifier for each of the ballots.

46. The method of claim 44, further comprising storing the ballot information in relation to the unique identifier for each of the ballots.

47. The method of claim 44, further comprising detecting the unique identifier printed on each of the ballots.

48. The method of claim 44, wherein the processing step comprises producing an image of each of the ballots and processing the image of each of the ballots to (1) determine the voting selections marked thereon and (2) detect the unique identifier printed thereon.

49. The method of claim 44, wherein each unique identifier comprises a unique string of alphanumeric characters.

50. The method of claim 44, wherein each unique identifier is printed in a black color.

51. The method of claim 44, wherein each unique identifier is printed in a non-black color.

52. The method of claim 44, wherein the ballots may be processed during an initial count of the ballots or during a recount of the ballots, and wherein a first unique identifier is printed on each of the ballots during the initial count and wherein a second unique identifier is printed on each of the ballots during the recount.

53. The method of claim 52, wherein the first unique identifier is printed in a first color and the second unique identifier is printed in a second color.

54. The method of claim 52, further comprising detecting the first unique identifier on each of the ballots during the recount to verify that each of the ballots was processed during the initial count.

55. The method of claim 44, wherein at least a portion of the ballots include at least one write-in vote for a contest on the ballot, and wherein the ballot information on the report includes an identification of the contest containing the write-in vote in relation to the unique identifier for each of the ballots.

56. The method of claim 44, wherein at least a portion of the ballots include at least one voting irregularity associated with a contest on the ballot, and wherein the ballot information on the report includes an indication of the voting irregularity in relation to the unique identifier for each of the ballots.

57. The method of claim 56, wherein the voting irregularity is selected from the following group: an undervote, an overvote, and a blank ballot.

58. The method of claim 44, wherein at least a portion of the ballots are associated with a processing error, and wherein the ballot information on the report includes an indication of the processing error in relation to the unique identifier for each of the ballots.

59. The method of claim 58, wherein the processing error is selected from the following group: a read error, an invalid ballot identification code, and a double feed error.

60. A method for processing a plurality of marked paper ballots at a central election office, wherein each of the marked paper ballots has one or more voting selections selected by a voter marked thereon, comprising:

receiving a stack of marked ballots to be processed;

processing each of the marked ballots in the stack by:

(a) printing an identifier on the marked ballot;

(b) detecting the identifier printed on the marked ballot;

(c) determining the voting selections marked on the ballot; and (d) storing the marked ballots.

61. The method of claim 60, wherein a first identifier is printed on each of the ballots during an initial count of the ballots and wherein a second identifier is printed on each of the ballots during a recount of the ballots.

62. The method of claim 61, wherein the first identifier is printed in a first color and the second identifier is printed in a second color.

63. The method of claim 60, wherein each identifier is detected so as to verify that each of the ballots was processed during a previous count of the ballots.

64. The method of claim 60, wherein each identifier is detected so as to prevent double-processing of each of the ballots.

65. The method of claim 60, wherein each identifier comprises a unique string of alphanumeric characters.

66. The method of claim 65, further comprising generating the unique string of alphanumeric characters for each of the ballots.

67. The method of claim 60, wherein the processing step comprises producing an image of each of the ballots and processing the image of each of the ballots to (1) determine the voting selections marked thereon and (2) detect the identifier printed thereon.

68. The method of claim 60, wherein each identifier is printed in a black color.

69. The method of claim 60, wherein each identifier is printed in a non-black color.

70. The method of claim 60, wherein each identifier comprises a unique identifier.

71. The method of claim 70, further comprising printing at least one report that includes ballot information relating to at least a portion of the processed ballots, wherein the report identifies the ballot information in relation to the unique identifier for each of the ballots.

72. The method of claim 71, wherein at least a portion of the ballots include at least one write-in vote for a contest on the ballot, and wherein the ballot information on the report includes an identification of the contest containing the write-in vote in relation to the unique identifier for each of the ballots.

73. The method of claim 71, wherein at least a portion of the ballots include at least one voting irregularity associated with a contest on the ballot, and wherein the ballot information on the report includes an indication of the voting irregularity in relation to the unique identifier for each of the ballots.

74. The method of claim 73, wherein the voting irregularity is selected from the following group: an undervote, an overvote, and a blank ballot.

75. The method of claim 71, wherein at least a portion of the ballots are associated with a processing error, and wherein the ballot information on the report includes an indication of the processing error in relation to the unique identifier for each of the ballots.

76. The method of claim 75, wherein the processing error is selected from the following group: a read error, an invalid ballot identification code, and a double feed error.

77. The method of claim 70, further comprising storing the ballot information in relation to the unique identifier for each of the ballots.

* * * * *